United States Patent
Onishi et al.

(10) Patent No.: US 12,443,351 B2
(45) Date of Patent: Oct. 14, 2025

(54) MEMORY SYSTEM

(71) Applicant: Kioxia Corporation, Tokyo (JP)

(72) Inventors: Shohei Onishi, Kanagawa (JP); Yohei Hasegawa, Tokyo (JP)

(73) Assignee: Kioxia Corporation, Tokyo (JP)

(*) Notice: Subject to any disclaimer, the term of this patent is extended or adjusted under 35 U.S.C. 154(b) by 35 days.

(21) Appl. No.: 18/604,946

(22) Filed: Mar. 14, 2024

(65) Prior Publication Data
US 2024/0319891 A1  Sep. 26, 2024

(30) Foreign Application Priority Data

Mar. 24, 2023 (JP) .................. 2023-048421

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC .... G06F 3/0619; G06F 3/0659; G06F 3/0673; G06F 3/0616; G06F 3/0679
See application file for complete search history.

(56) References Cited

U.S. PATENT DOCUMENTS

| | | | |
|---|---|---|---|
| 10,733,110 B1 | 8/2020 | Volpe | |
| 11,436,137 B2 | 9/2022 | Wang et al. | |
| 2013/0145111 A1* | 6/2013 | Murakami | G06F 3/061 711/162 |
| 2017/0185295 A1* | 6/2017 | Byun | G06F 3/061 |
| 2020/0065029 A1* | 2/2020 | Kim | G06F 3/0625 |
| 2020/0211665 A1* | 7/2020 | Lee | G11C 29/886 |
| 2021/0294739 A1 | 9/2021 | Oh et al. | |
| 2022/0050610 A1 | 2/2022 | Brandt | |
| 2022/0261160 A1 | 8/2022 | Sun et al. | |
| 2022/0308766 A1 | 9/2022 | Onishi et al. | |

OTHER PUBLICATIONS

David Wang, "Compute Express Link™(CXL™) 2.0—Architecture and Benefits for Computational Storage", SNIA Compute, Memory, and Storage Summit, Apr. 21-22, 2021, PMCS22-Benjamin-CXL-Advancing-Next-Generation-of-Data-Centers, https://www.snia.org/sites/default/files/PM-Summit/2021/snia-pm-cs-summit-Wang-CXL-ComputationalStorage-2021.pdf, 13 pages.

Alan Benjamin, "Compute Express Link™ (CXL™): Advancing the Next Generation of Data Centers", Apr. 22, 2022, snia-pm-cs-summit-Wang-CXL-ComputationalStorage-2021 https://www.snia.org/sites/default/files/PM-Summit/2022/PMCS22-Benjamin-CXL-Advancing-Next-Generation-of-Data-Centers.pdf, 14 pages.

* cited by examiner

*Primary Examiner* — Hiep T Nguyen
(74) *Attorney, Agent, or Firm* — Maier & Maier, PLLC

(57) ABSTRACT

According to one embodiment, a memory system includes a first memory region, a second memory region, and a controller. The controller is configured to control coupling between the first memory region and the second memory region at one end and a host device at another, generate first interleave setting information corresponding to the first memory region, select the first memory region based on the first interleave setting information when an access request is received from the host device, and update the first interleave setting information to second interleave setting information corresponding to the second memory region and not corresponding to the first memory region based on an amount of accumulated wear in the first memory region.

20 Claims, 33 Drawing Sheets

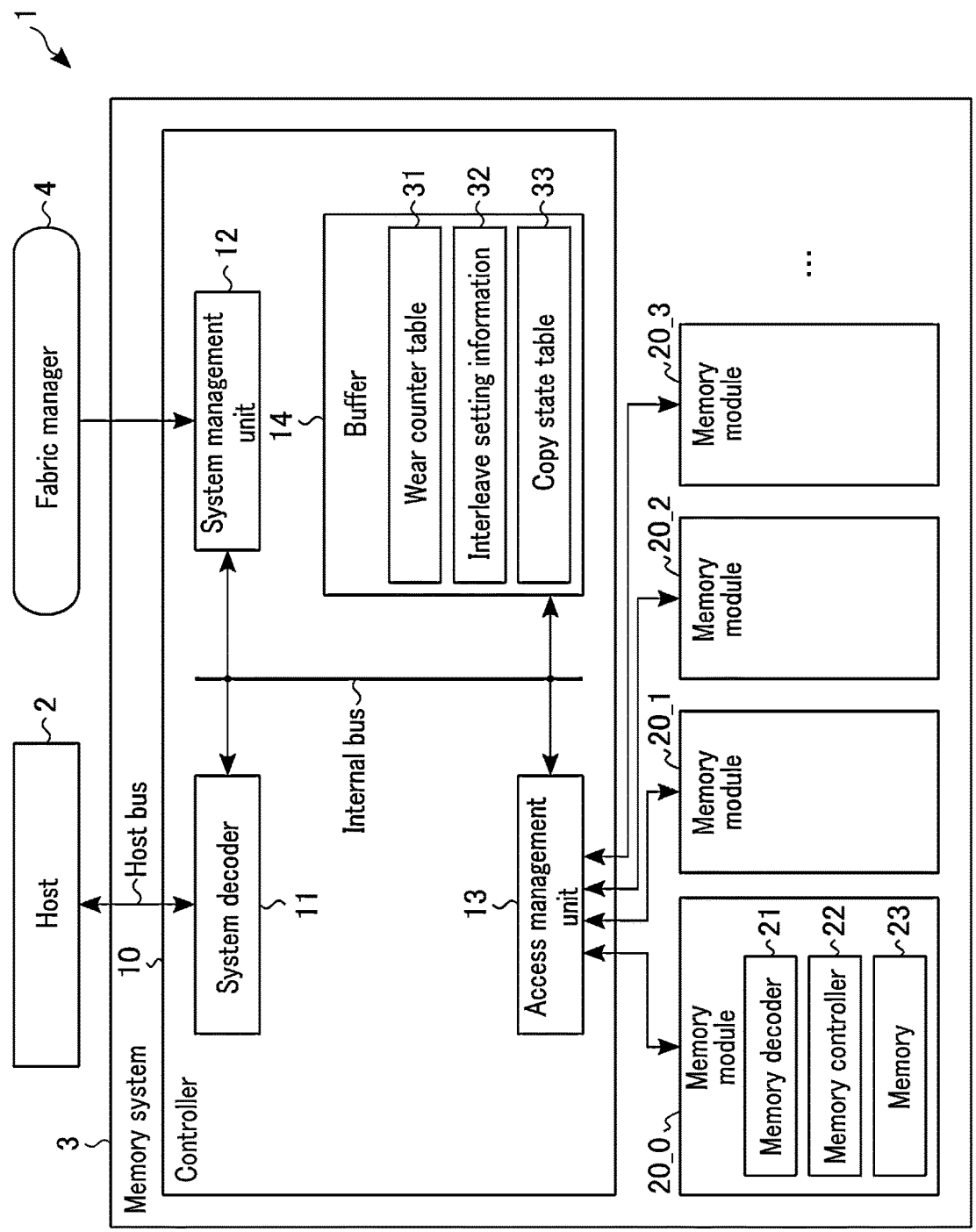
F I G. 1

| Information | LD0 | LD1 | LD2 | LD3 | ⋯ |
|---|---|---|---|---|---|
| Amount of accumulated wear | 1000 | 30 | 5000 | 2500 | ⋯ |
| Storage capacity | 1TB | 1TB | 1TB | 1TB | ⋯ |

FIG. 3

| IW | IG | Target ID | |
|---|---|---|---|
| 1 | 1KB | LD0 | IS before updating |
| 4 | 1KB | LD3→LD4→LD2→LD6 | IS after updating |

FIG. 4

| IS ID | Copy size | Copy flag |
|---|---|---|
| 0 | 1 | 01001101000001⋯ |
| 1 | 16 | 00000000100000⋯ |
| 2 | 4 | 11110101010010⋯ |

1: Copying completed
0: Copying not completed

FIG. 5

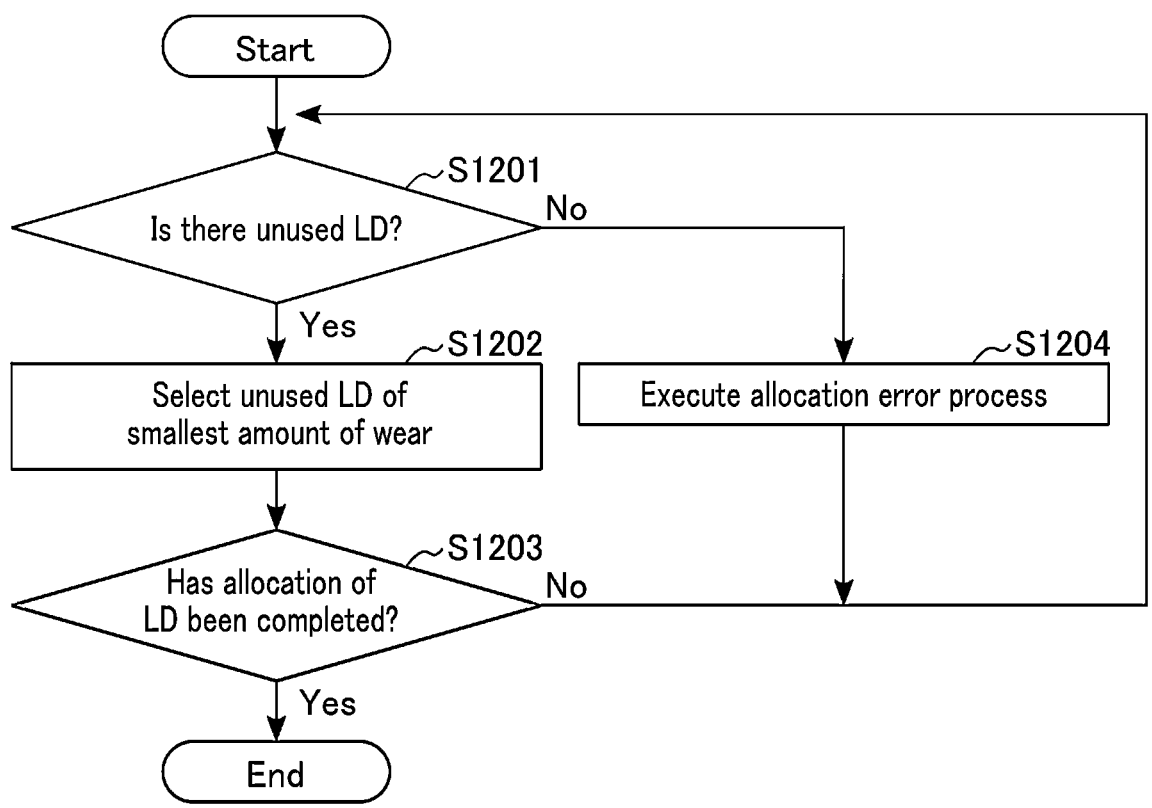
F I G. 10

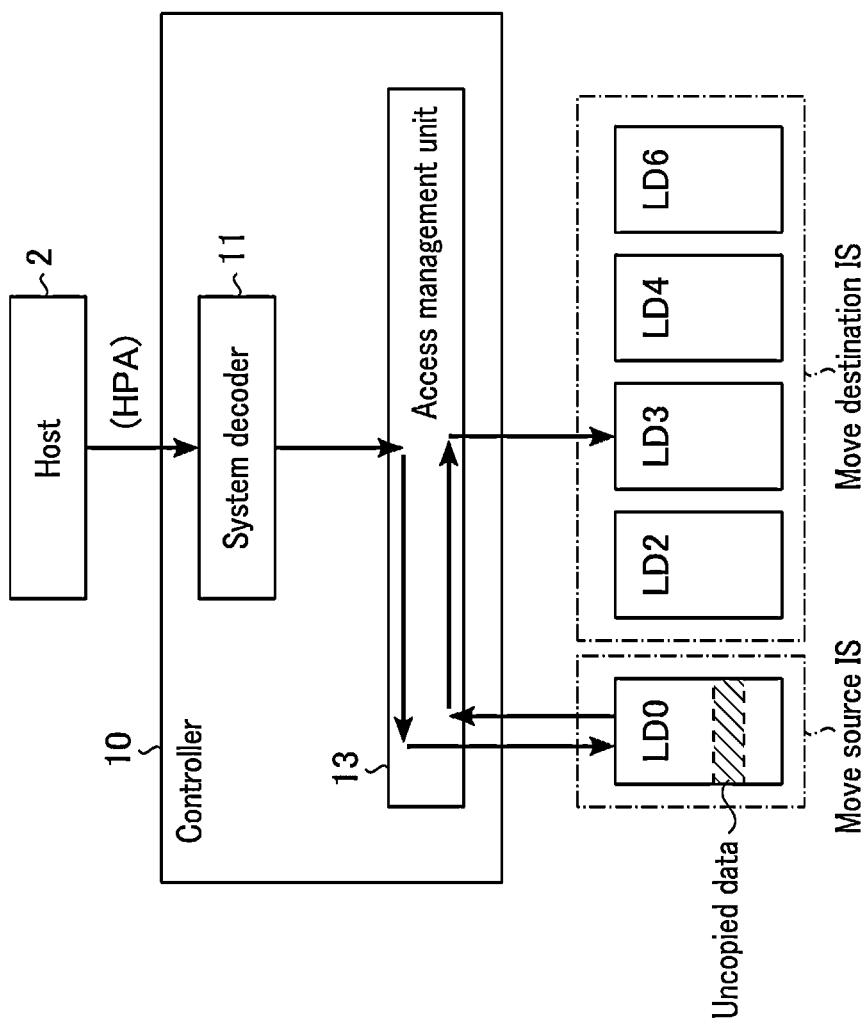
F I G. 13

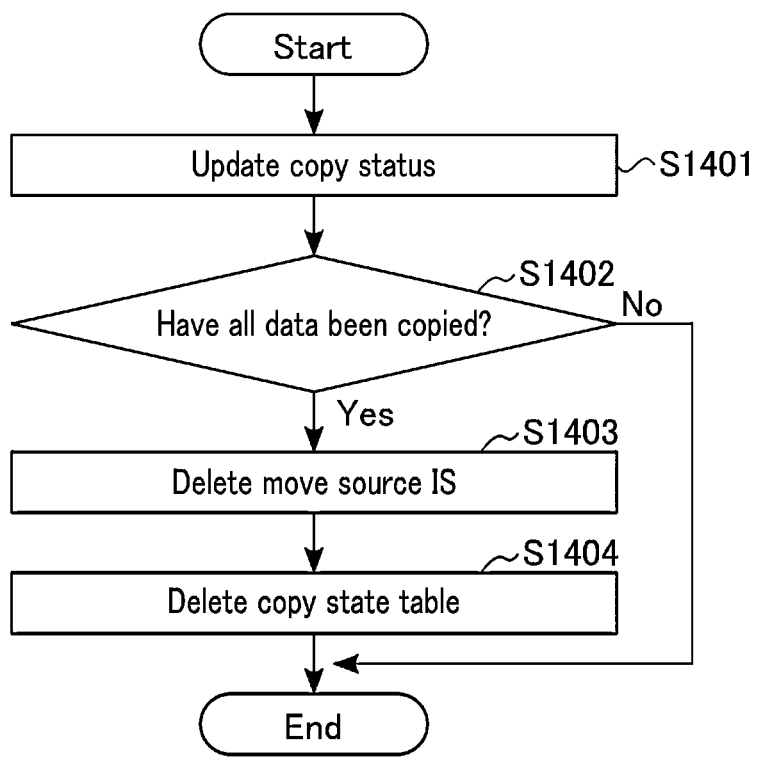
F I G. 14

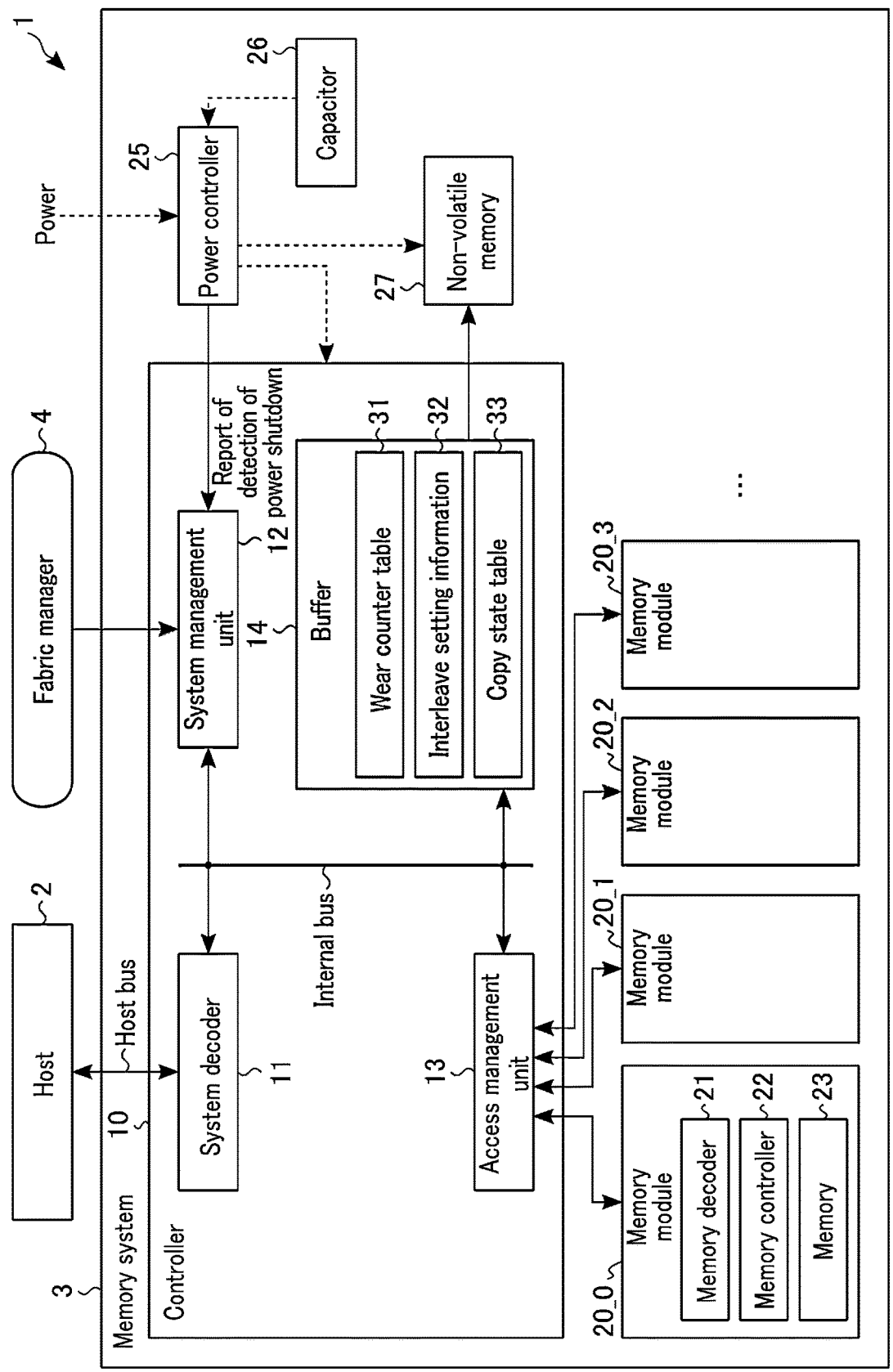
F I G. 18

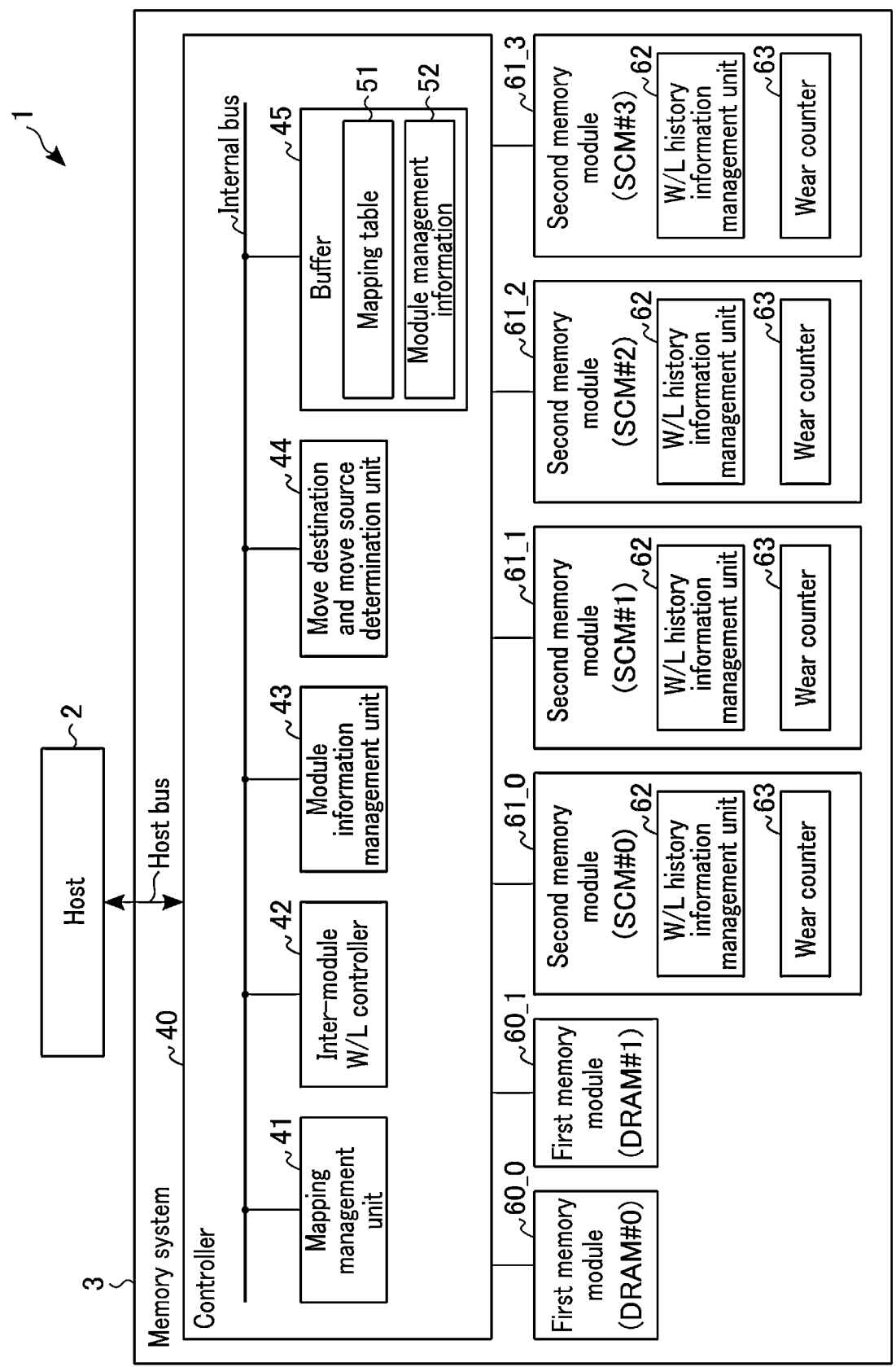
F I G. 19

| Index | Module identifier | Logical address |
|---|---|---|
| ⋮ | ⋮ | ⋮ |
| 0x3e526 | 22 | 0x1234 |
| ⋮ | ⋮ | ⋮ |

F I G. 20

|  | SCM#0 | SCM#1 | SCM#2 | SCM#3 |
|---|---|---|---|---|
| Amount of accumulated wear | 1000 | 30 | 5000 | 2500 |
| Storage capacity | 1TB | 1TB | 1TB | 1TB |
| W/L cycle | 1000 | 300 | 2000 | 5000 |
| W/L granularity | 1KB | 4KB | 128B | 128B |

F I G. 21

| Entry | Logical address |
|---|---|
| 0 | 0x100 |
| 1 | 0x002 |
| ⋮ | ⋮ |
| N−1 | 0x356 |

F I G. 22

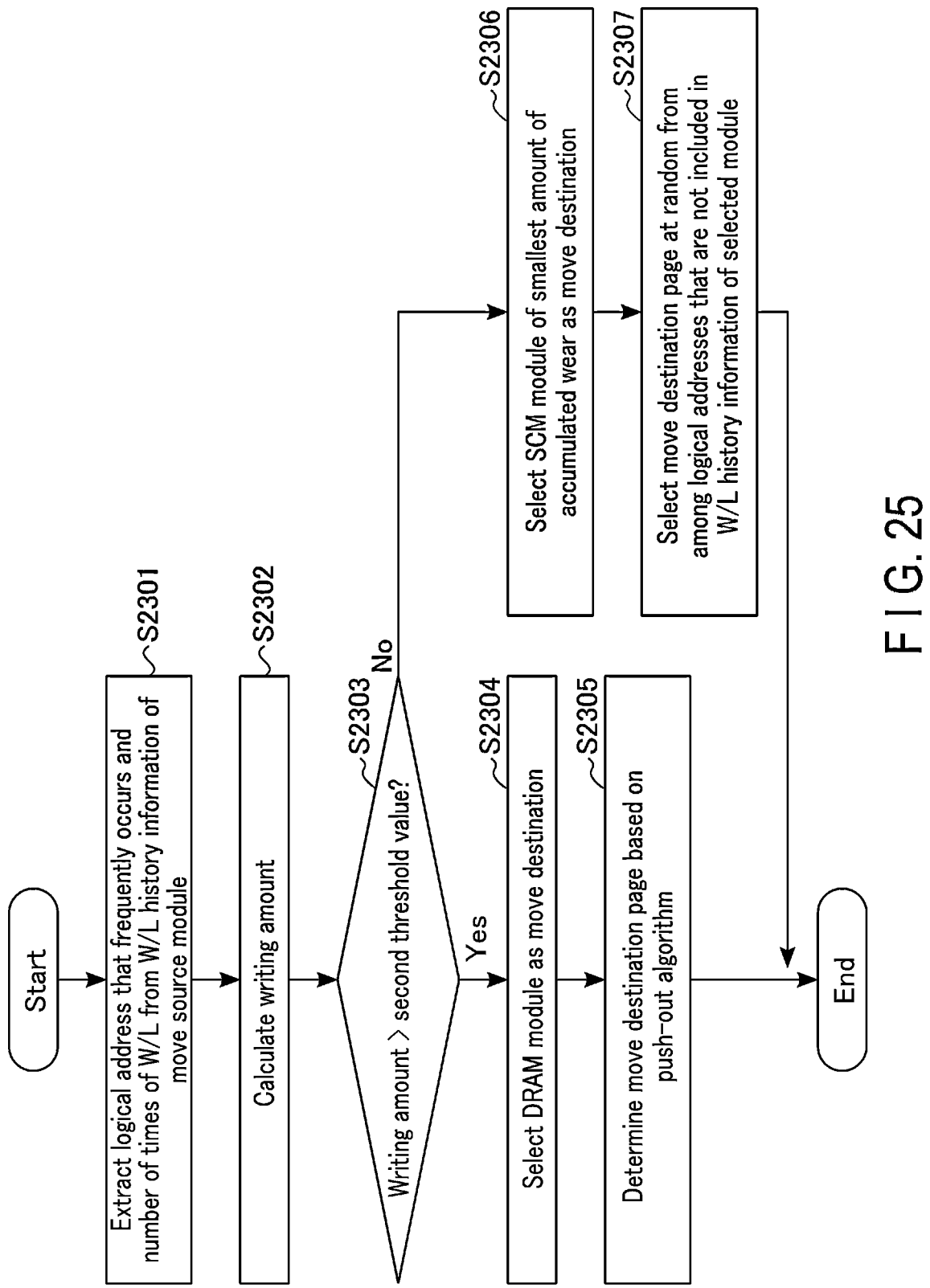
F I G. 25

| Entry | Logical address | Time stamp |
|---|---|---|
| 0 | 0x100 | 0 |
| 1 | 0x002 | 100 |
| ⋮ | ⋮ | ⋮ |
| N−1 | 0x356 | 5020 |

F I G. 26

| Entry | Logical address | Number of times of W/L |
|---|---|---|
| 0 | 0x100 | 10 |
| 1 | 0x002 | 1 |
| ⋮ | ⋮ | ⋮ |
| N−1 | 0x356 | 4 |

F I G. 27

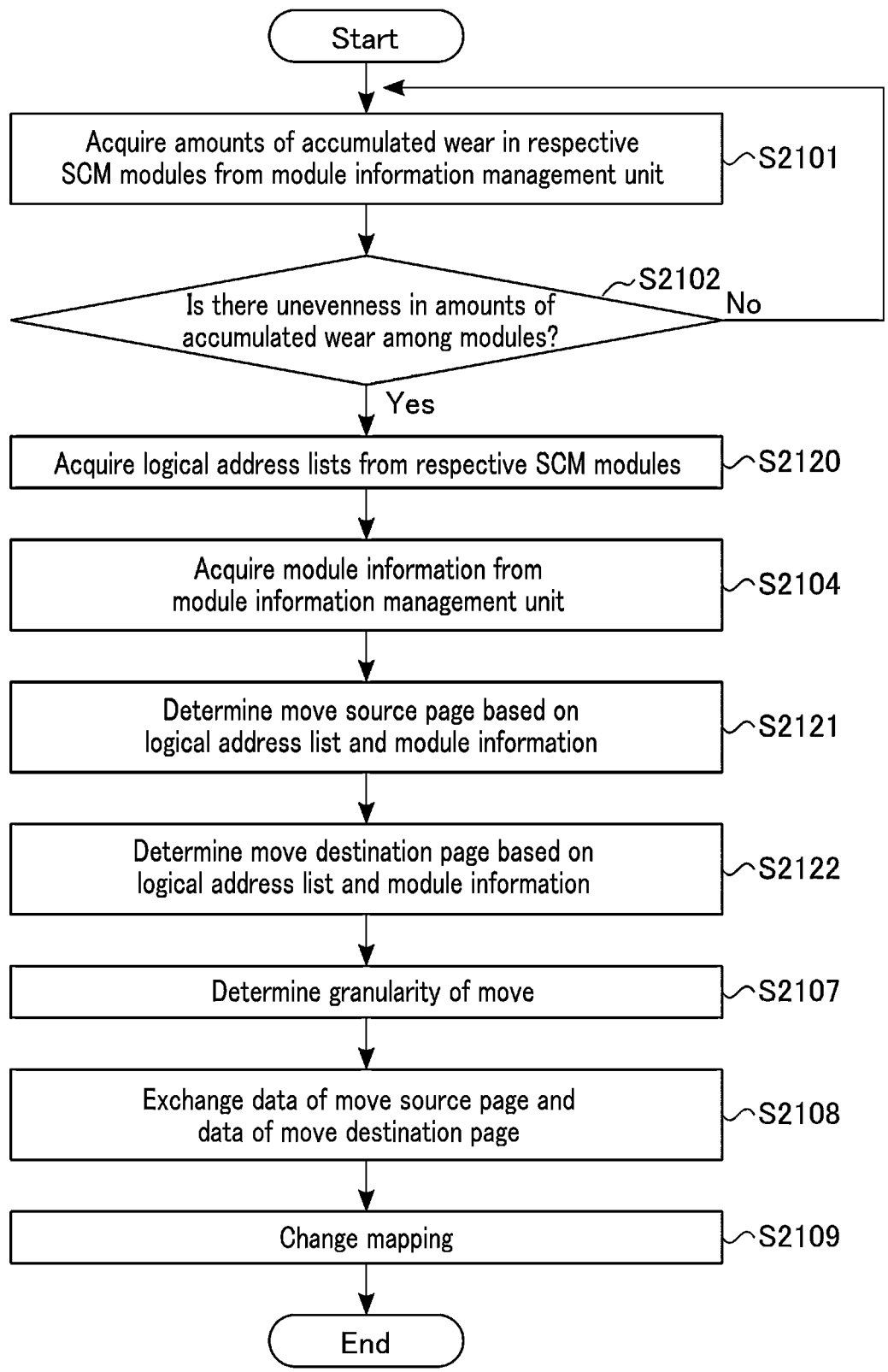
F I G. 28

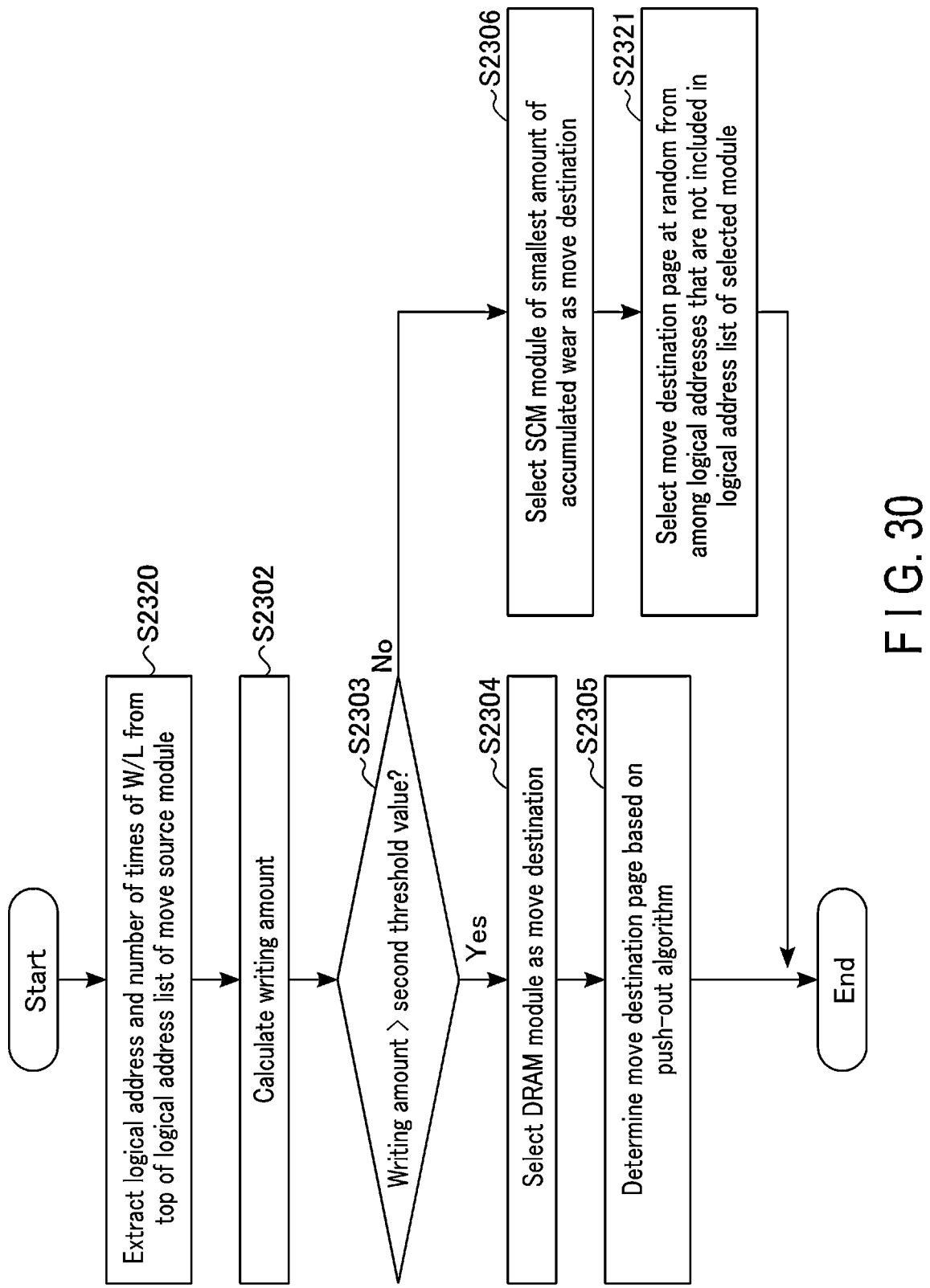
F I G. 30

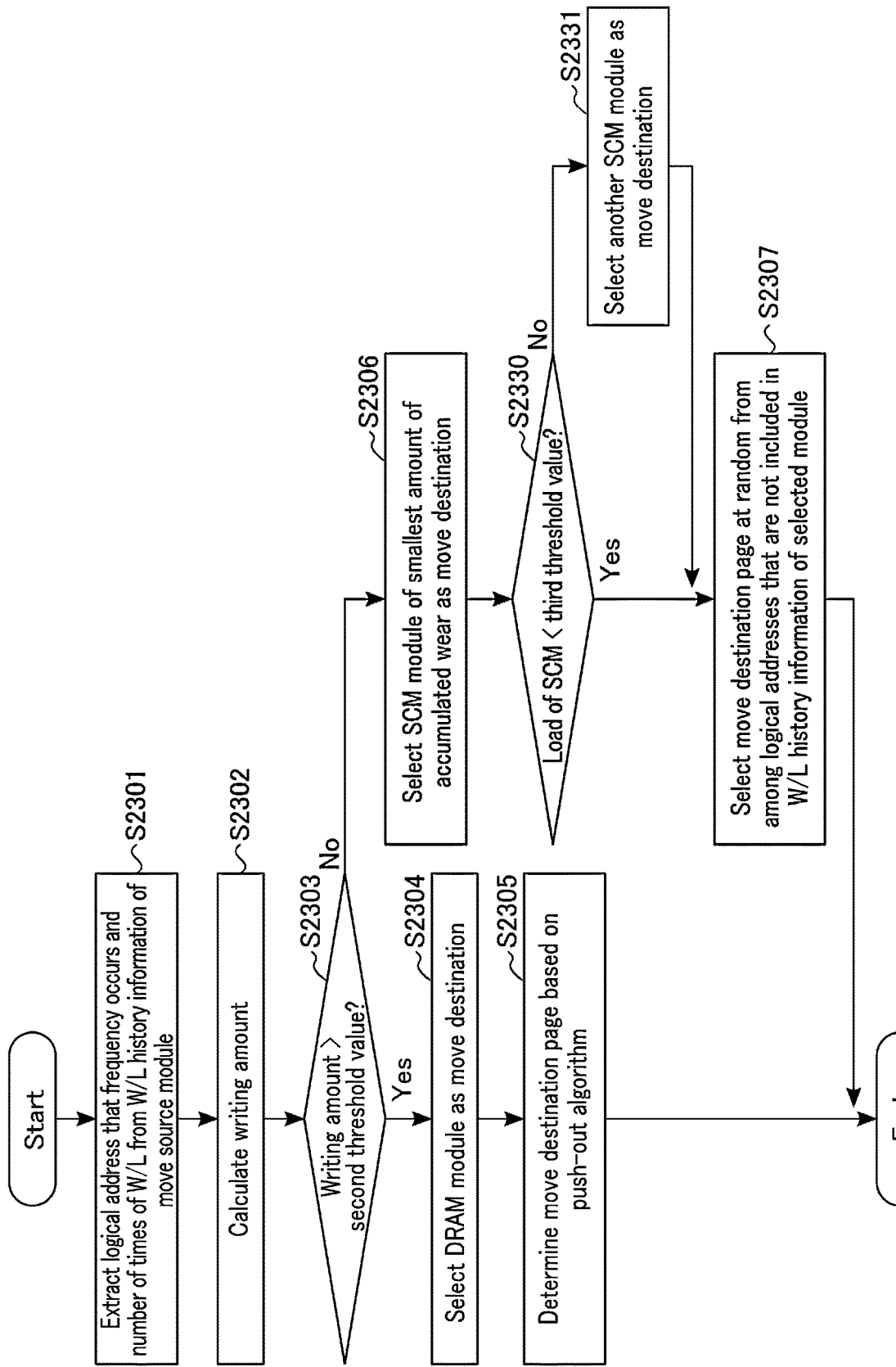
F I G. 31

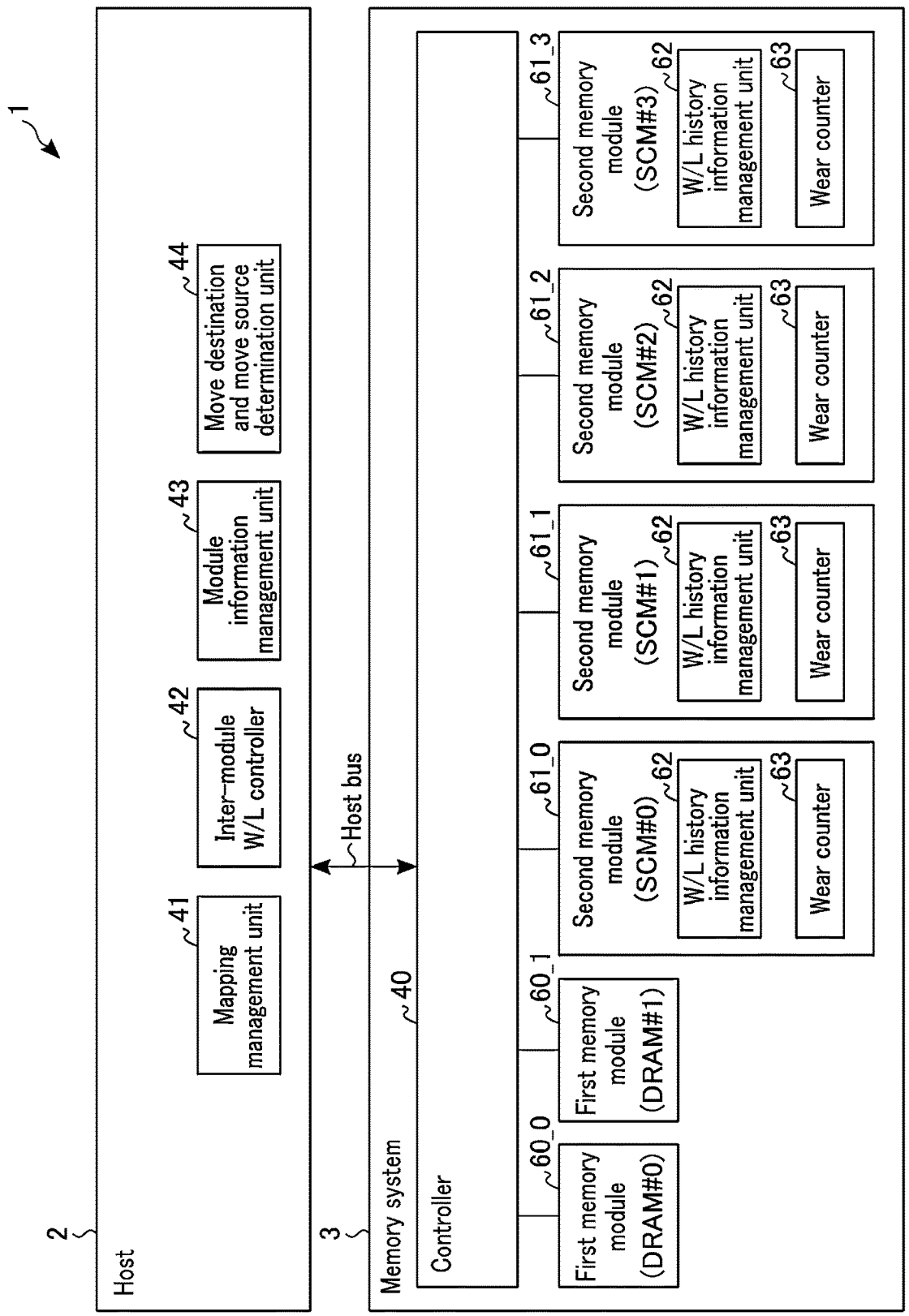
F I G. 33

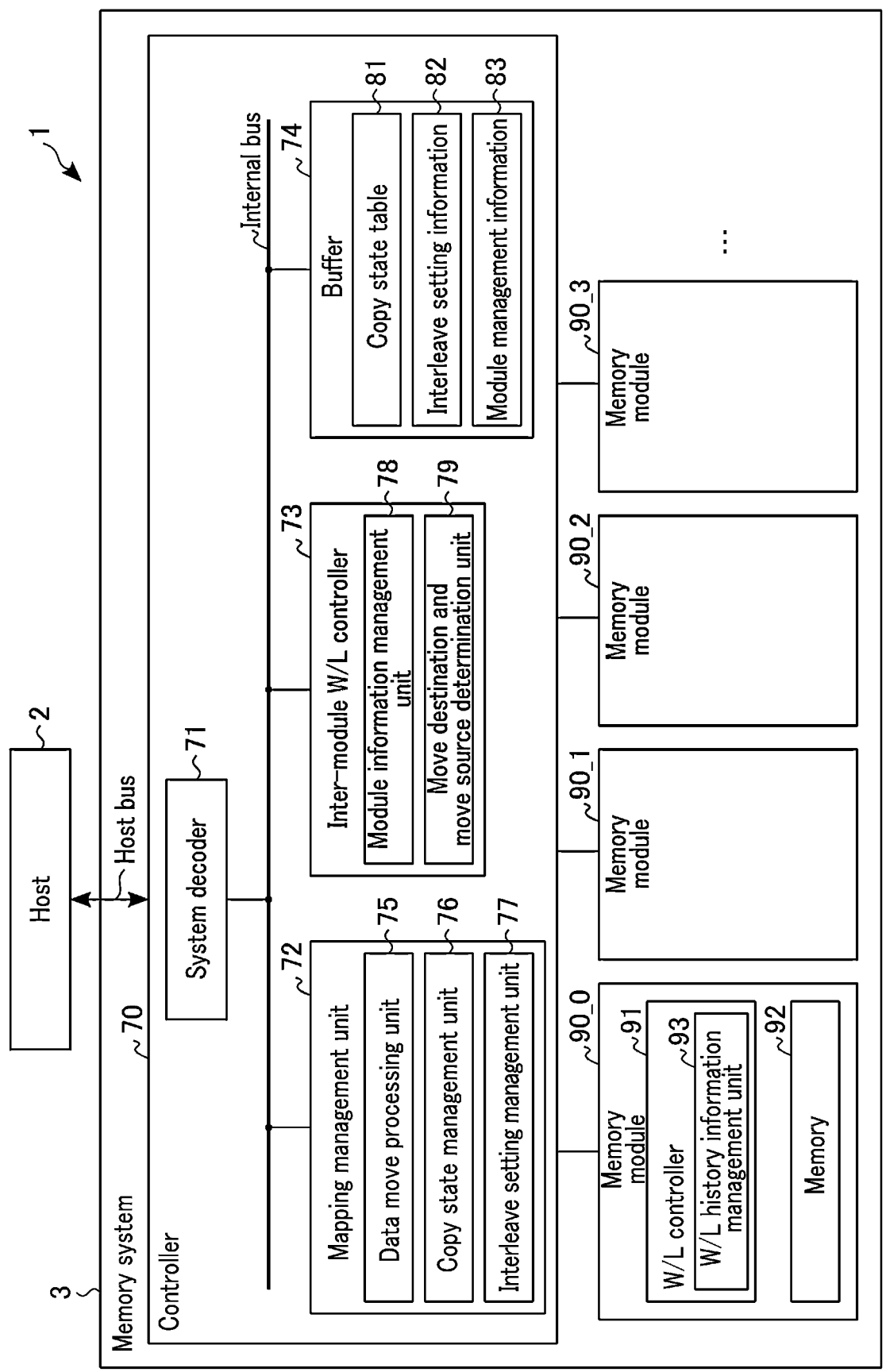
F I G. 34

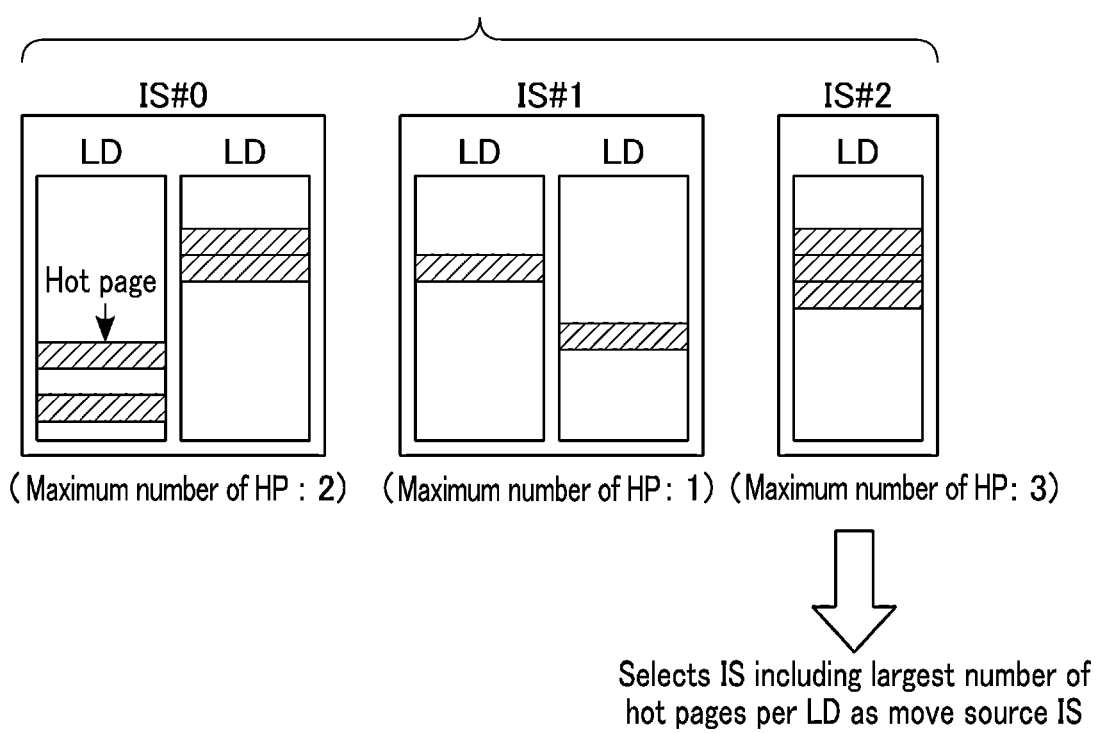
F I G. 38

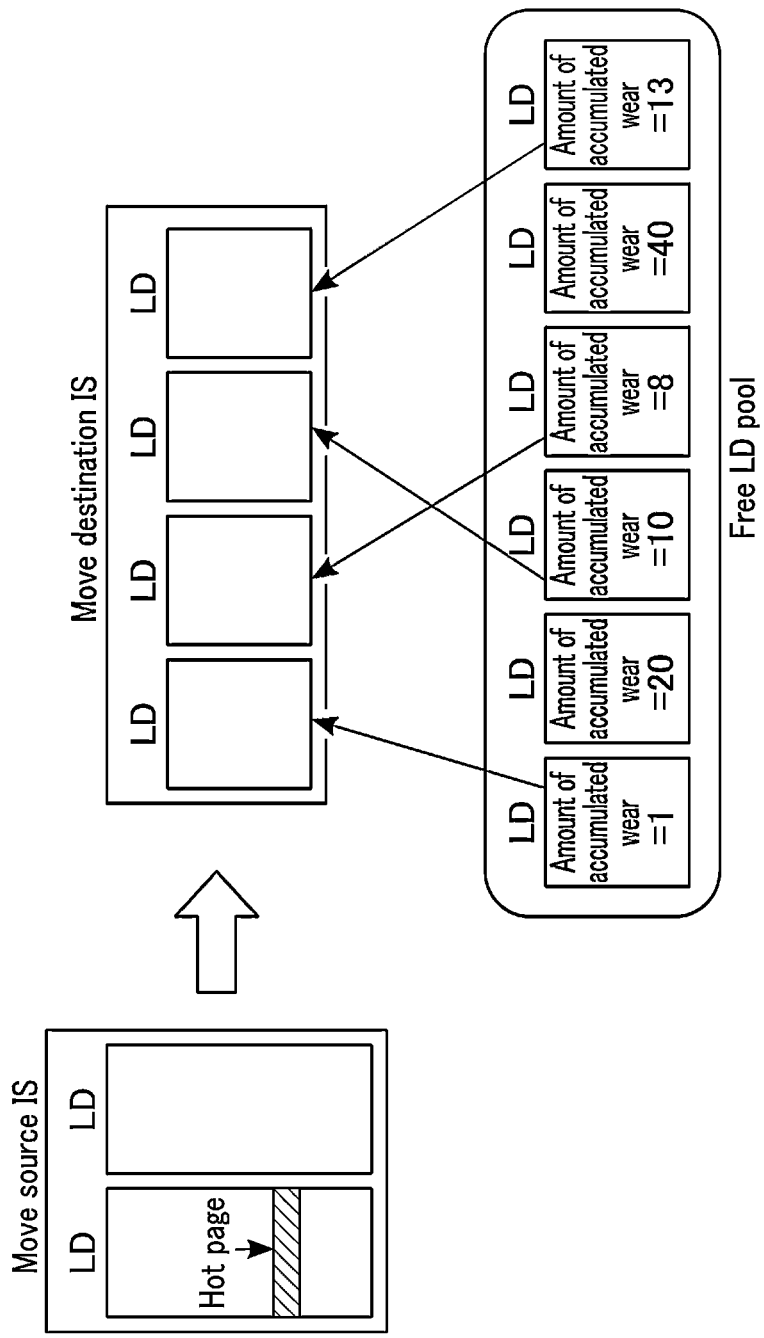
F I G. 39

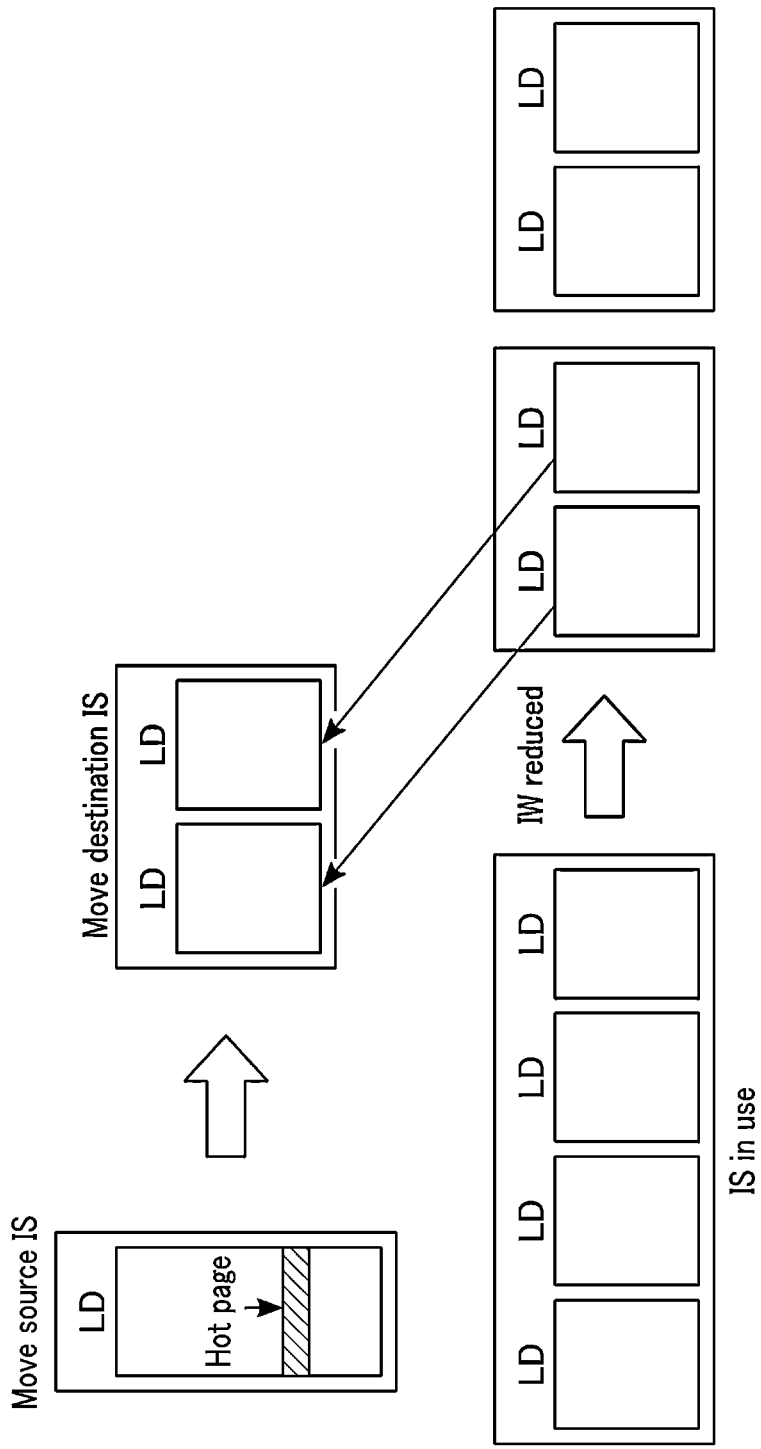
F I G. 40

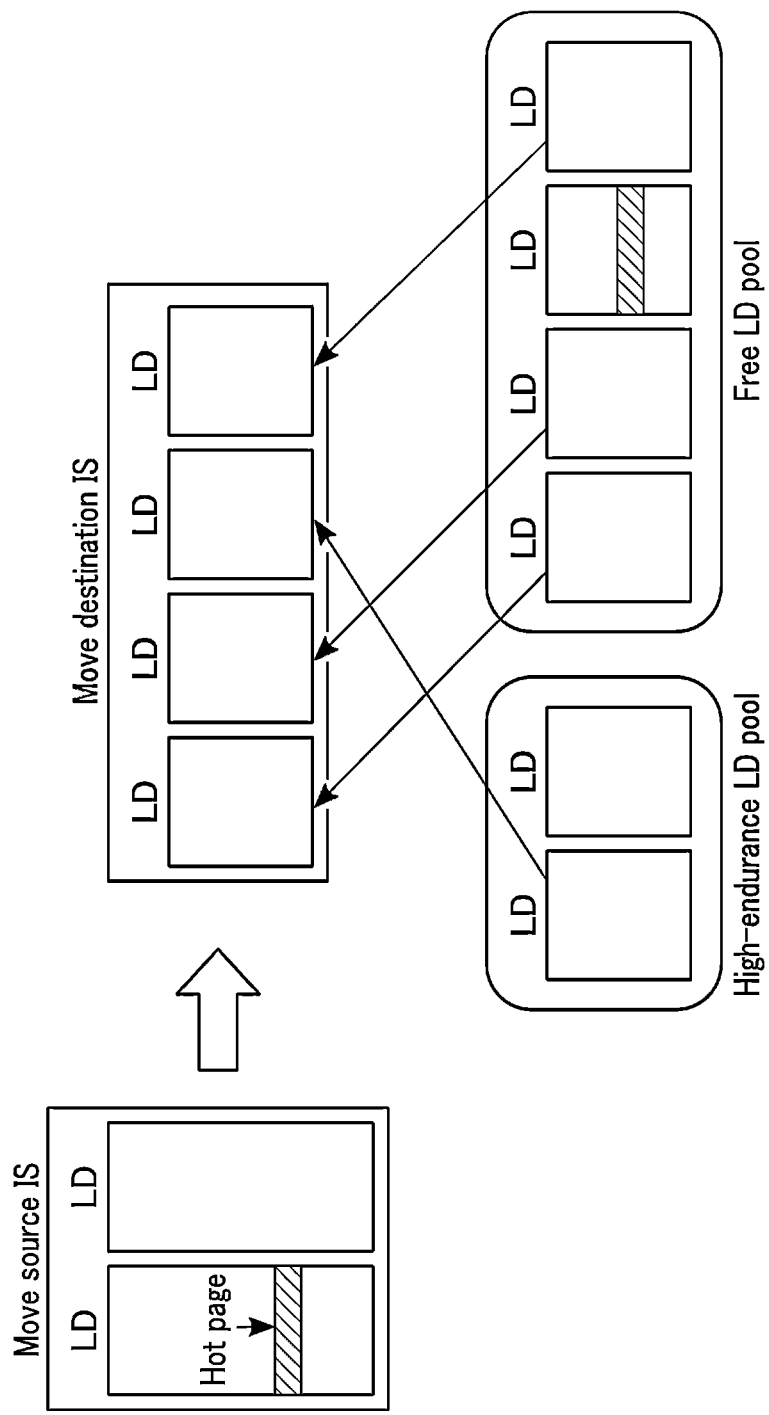
F I G. 41

MEMORY SYSTEM

CROSS-REFERENCE TO RELATED APPLICATION(S)

This application is based upon and claims the benefit of priority from Japanese Patent Application No. 2023-048421, filed Mar. 24, 2023, the entire contents of which are incorporated herein by reference.

FIELD

Embodiments described herein relate generally to a memory system.

BACKGROUND

Compute Express Link (CXL) (registered trademark) is known as a standard of connection between a host device and a memory system. CXL uses a signal that is physically the same as that used in Peripheral Component Interconnect-Express (PCIe) (registered trademark). CXL defines three protocols, (CXL.io), (CXL.cache), and (CXL.mem). CXL.io is a protocol based on PCIe. CXL.cache is a protocol for a host device and a memory system to access while maintaining a cache coherency. CXL.mem is a protocol for coherently accessing a memory device included in a memory system. A memory system compliant with CXL 2.0 is applicable to a plurality of host devices. The memory system compliant with CXL 2.0 has a memory pooling function which can virtually divide a memory system into a plurality of devices.

BRIEF DESCRIPTION OF THE DRAWING(S)

FIG. 1 is a block diagram showing an overall configuration of a data processing apparatus including a memory system according to a first embodiment.

FIG. 3 is a table showing a specific example of a wear counter table 31 provided in the memory system according to the first embodiment.

FIG. 4 is a table showing a specific example of interleave setting information provided in the memory system according to the first embodiment.

FIG. 5 is a table showing a specific example of a copy state table provided in the memory system according to the first embodiment.

FIG. 10 is a flowchart of selection of a target logical device in the memory system according to the first embodiment.

FIG. 13 is a diagram showing a specific example of reading data by identifying an address of a move source interleave set in the memory system according to the first embodiment.

FIG. 14 is a flowchart of a copy completion process in the memory system according to the first embodiment.

FIG. 18 is a block diagram showing an overall configuration of a data processing apparatus including a memory system according to a third modification of the first embodiment.

FIG. 19 is a block diagram showing an overall configuration of a data processing apparatus including a memory system according to a second embodiment.

FIG. 20 is a table showing a specific example of a mapping table provided in the memory system according to the second embodiment.

FIG. 21 is a table showing a specific example of module management information provided in the memory system according to the second embodiment.

FIG. 22 is a table showing a specific example of wear leveling history information provided in the memory system according to the second embodiment.

FIG. 25 is a flowchart of determination of move destination page in the memory system according to the second embodiment.

FIG. 26 is a table showing a specific example of wear leveling history information provided in the memory system according to a first modification of the second embodiment.

FIG. 27 is a table showing a specific example of a logical address list provided in the memory system according to a second modification of the second embodiment.

FIG. 28 is a flowchart showing moving of data in wear leveling in the memory system according to the second modification of the second embodiment.

FIG. 30 is a flowchart of determination of move destination page in the memory system according to the second modification of the second embodiment.

FIG. 31 is a flowchart of determination of move destination page in the memory system according to a third modification of the second embodiment.

FIG. 33 is a block diagram showing an overall configuration of a data processing apparatus including a memory system according to a fifth modification of the second embodiment.

FIG. 34 is a block diagram showing an overall configuration of a data processing apparatus including a memory system according to a third embodiment.

FIG. 38 is a diagram for explaining a third specific example of selection of a move source interleave set in the memory system according to the third embodiment.

FIG. 39 is a diagram for explaining a first specific example of selection of a target logical device in the memory system according to the third embodiment.

FIG. 40 is a diagram for explaining a second specific example of selection of a target logical device in the memory system according to the third embodiment.

FIG. 41 is a diagram for explaining a third specific example of selection of a target logical device in the memory system according to the third embodiment.

DETAILED DESCRIPTION

Figure 2:
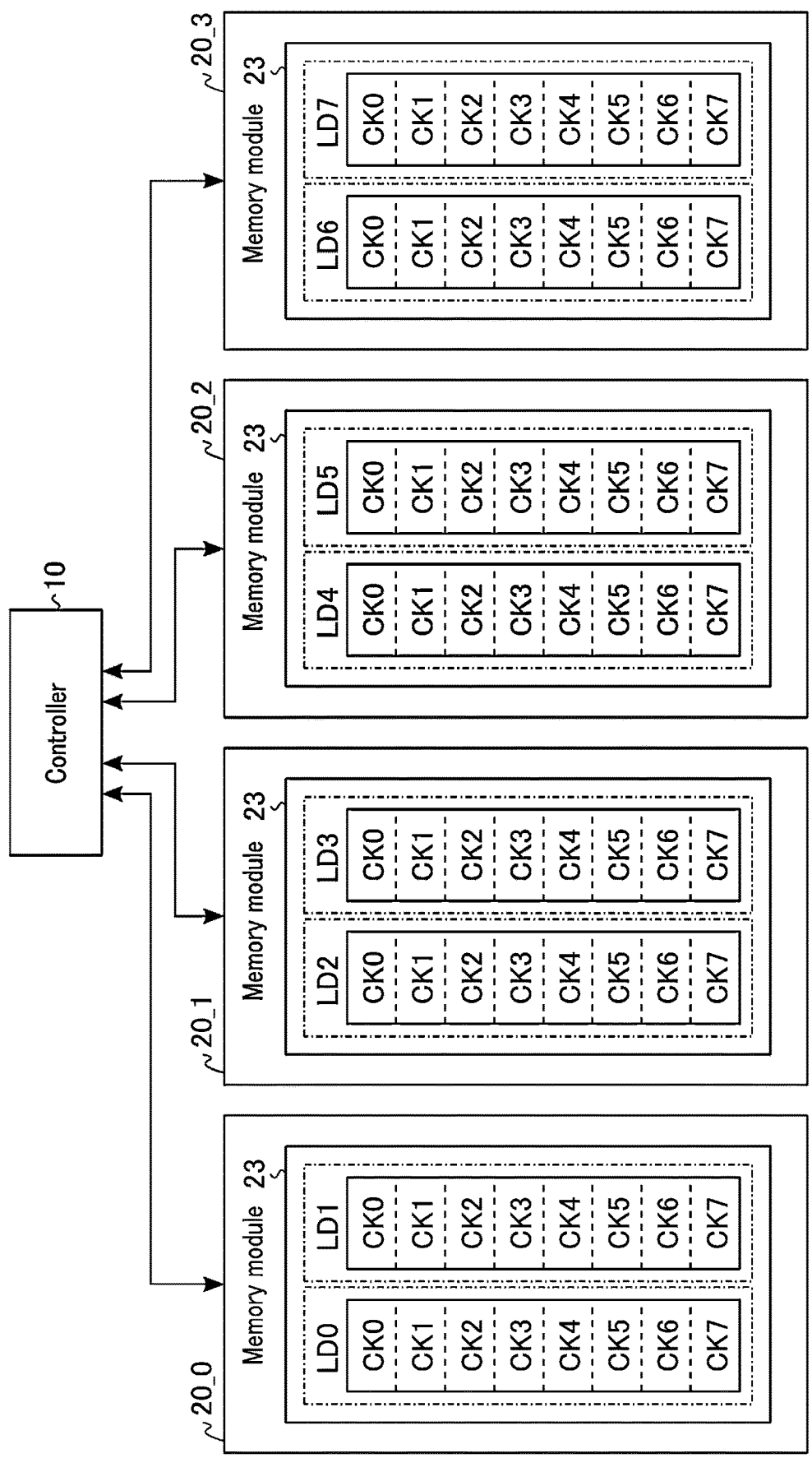
FIG. 2 is a block diagram showing a logical configuration of a memory module provided in the memory system according to the first embodiment.

In general, according to one embodiment, a memory system includes a first memory region, a second memory region, and a controller. The controller is configured to control coupling between the first memory region and the second memory region at one end and a host device at another, generate first interleave setting information corresponding to the first memory region, select the first memory region based on the first interleave setting information when an access request is received from the host device, and update the first interleave setting information to second interleave setting information corresponding to the second memory region and not corresponding to the first memory region based on an amount of accumulated wear in the first memory region.

Hereinafter, embodiments will be described with reference to the accompanying drawings. Each embodiment exemplifies a device and a method for embodying the technical idea of the invention. It should be noted that the drawings are schematic or conceptual, and that the dimensions and scales of the drawings are not necessarily the same as those of the actual products. The entire description of a particular embodiment also applies to other embodiments unless explicitly mentioned otherwise or obviously excluded. The technical idea of the present invention is not specified by the shapes, structures, arrangements, etc. of the structural elements.

In the following description, structural elements having substantially the same function and configuration will be denoted by the same reference symbol. The numbers after the letters of reference symbols are referred to by the reference symbols containing the same letters and are used to distinguish between elements having similar configurations. If elements represented by reference symbols containing the same letters need not be distinguished, those elements are referred to by a reference symbol containing only the letters.

1. First Embodiment

1.1 Configuration

1.1.1 Configuration of Data Processing Apparatus

First, an example of a configuration of a data processing apparatus 1 will be described with reference to FIG. 1. FIG. 1 is a block diagram showing an overall configuration of the data processing apparatus 1.

As shown in FIG. 1, the data processing apparatus 1 includes a host device 2 and a memory system 3. A plurality of host devices 2 may be coupled to the memory system 3. In the present embodiment, a case will be described in which CXL 2.0 (trademark) is applied as the connection standard for interconnection between the host device 2 and the memory system 3. The connection standard is not limited to CXL 2.0.

The host device 2 is an information processing apparatus (computing device) that accesses the memory system 3. For example, the host device 2 requests (commands) the memory system 3 to perform a data write operation or a data read operation. For example, a write request includes data, a command, and a host physical address (HPA). A read request includes a command and a host physical address HPA. For example, the host device 2 transmits a request (access request) to the memory system 3 based on the CXL.mem protocol.

The memory system 3 is coupled to the host device 2 via a host bus. The memory system 3 may be coupled to the host device 2 via a network or wireless communication. The memory system 3 executes a write operation or a read operation based on an access request from the host device 2. The memory system 3 transmits a command response to the host device 2 upon completion of the operation based on the access request (command).

A fabric manager (FM) 4 is used for dynamic management of a memory resource in the memory system 3 and management of allocating the memory resource to the host device 2. In other words, the fabric manager 4 manages a configuration of the memory resource of the memory system 3 from the viewpoint of the host device 2. For example, the fabric manager 4 is software that works on any hardware in the data processing apparatus 1. A dedicated circuit for the fabric manager 4 may be provided. The fabric manager 4 may be executed by the host device 2 or the memory system 3. The fabric manager 4 transmits a management command to a system management unit 12 via a fabric manager application programming interface (API).

1.1.2 Configuration of Memory System

Next, an example of a configuration of the memory system 3 will be described with reference to FIG. 1.

As shown in FIG. 1, the memory system 3 includes a controller 10 and a plurality of memory modules (storage units, or memory units) 20. In the example of FIG. 1, the memory system 3 includes four memory modules 20_0 to 20_3. In the following, the memory module 20 is referred to as the "device", or is simply referred to as the "module".

The controller 10 corresponds to a CXL switch in CXL 2.0. The controller 10 controls coupling between the host device 2 and the memory module 20. The controller 10 controls allocation of the memory resource of the memory module 20 to the host device 2.

The controller 10 can virtually divide a memory region of the memory module 20. The controller 10 manages each of the divided memory regions as a "logical device". The controller 10 has a function of dividing a piece of data and storing the divided pieces of data in a plurality of logical devices (hereinafter referred to as an "interleave").

The controller 10 can execute wear leveling among a plurality of memory modules 20 (logical devices) (hereinafter also referred to as "inter-module wear leveling"). The inter-module wear leveling is a process of leveling amounts of accumulated wear by exchanging data of a memory module 20 (logical device) in which the amount of accumulated wear is relatively large and data of a memory module 20 (logical device) in which the amount of accumulated wear is relatively small. The amount of accumulated wear is a value representing a degree of deterioration of the memory in the memory module 20. The amount of accumulated wear is based on the amount of wear in a memory due to a write operation, an erase operation, a read operation, or the like and the number of times of executing the operation.

The controller 10 includes a system decoder 11, the system management unit 12, an access management unit 13, and a buffer 14. The system decoder 11, the system management unit 12, the access management unit 13, and the buffer 14 are coupled to one another via an internal bus. Functions of the system decoder 11, the system management unit 12, and the access management unit 13 may be implemented by a program executed by a central processing unit (CPU) in the controller 10, or may be configured by separate circuits.

The system decoder 11 corresponds to a host-managed device memory (HDM) decoder in CXL 2.0. For example, the controller 10 includes an upstream port (USP) or a virtual upstream port (vUSP), which are not shown. The controller 10 is coupled to the host device 2 via the upstream port (USP) or the virtual upstream port (vUSP). For example, the system decoder 11 is provided in the upstream port or the virtual upstream port.

For example, in a case where a plurality of host devices 2 are coupled to the memory system 3, the memory system 3 includes a plurality of system decoders 11 respectively corresponding to the host devices 2. The system decoder 11 sets a connection between the corresponding host device 2 and one or more memory modules 20 based on interleave setting information 32 received from the system management unit 12. The system decoder 11 controls coupling between the access management unit 13 and the memory modules 20. The system decoder 11 transmits the access request received from the host device 2 to the access management unit 13. The system decoder 11 of the present embodiment does not convert the host physical address HPA included in the access request (write request or read request) received from the host device 2. The system decoder 11 transmits the host physical address HPA as it is to the access management unit 13.

The system management unit 12 receives the management command from the fabric manager 4. In a case where the fabric manager 4 is provided in the host device 2, the system management unit 12 may be coupled to the fabric manager 4 via the host bus or via another bus (compliant with a communication standard such as Ethernet (registered trademark)). The system management unit 12 has a function of a fabric manager endpoint (FM endpoint) in CXL 2.0. The system management unit 12 controls the system decoder 11 based on the management command and the interleave setting information 32 received via the fabric manager API.

The system management unit 12 controls inter-module wear leveling (hereinafter may simply be referred to also as "wear leveling"). For example, the system management unit 12 generates the interleave setting information 32. The system management unit 12 updates the interleave setting information 32 when wear leveling is performed. Thus, the system management unit 12 can dynamically control the interleave setting. The system management unit 12 transmits the updated interleave setting information 32 to the system decoder 11.

The system management unit 12 controls moving of data in the wear leveling. The system management unit 12 performs a copy-on-write (CoW) process as moving of data in the wear leveling. The copy-on-write process is an operation of executing moving (copying) of data from a move source address to a move destination address at a timing of a write operation (data updating) in the memory module 20. Details of the copy-on-write process will be described later.

The system management unit 12 updates a wear counter table 31, the interleave setting information 32, and a copy state table 33 stored in the buffer 14.

The wear counter table 31 is a table relating to an amount of accumulated wear and a storage capacity of each logical device. The system management unit 12 updates the wear counter table 31 based on information on the amount of accumulated wear received from each memory module 20.

The interleave setting information 32 is information relating to the number of logical devices coupled to the host device 2 (the system decoder 11) (hereinafter also referred to as "the number of interleaves"), the order of allocation of data to the target logical device, and the data size of a memory region in the logical device corresponding to the interleave (hereinafter also referred to as "the interleave granularity"). The system management unit 12 updates the interleave setting information 32 upon determination of executing the wear leveling based on the wear counter table 31.

The copy state table 33 is a table relating to a copy state of data in the copy-on-write process. The system management unit 12 updates the copy state table 33 when the data is copied, that is, when a write operation is performed.

The access management unit 13 manages connection with the memory modules 20 under the control of the system decoder 11. The access management unit 13 is coupled to each memory module 20 via a downstream port (DSP) or a virtual downstream port (vDSP) to the memory module 20. For example, the access management unit 13 transmits an access request to the memory module 20 based on the CXL.mem protocol. For example, in a case where the access request is a write request, the access management unit 13 transmits the data, the command, and the host physical address (HPA) to the target memory module 20. In addition, for example, the access management unit 13 transmits the interleave setting information 32 to each memory module 20 based on the CXL.io protocol.

The buffer 14 is a volatile memory. The buffer 14 temporarily stores data. The buffer memory 14 is, for example, a static random access memory (SRAM). The buffer 14 stores the wear counter table 31, the interleave setting information 32, the copy state table 33, and the like. To permanently store data, a non-volatile memory (not shown) may be provided outside or inside the controller 10, or a non-volatile memory region included in any of the memory modules 20 may be used.

Next, the configuration of the memory module 20 will be described. The memory module 20 corresponds to a CXL memory in CXL 2.0. For example, the memory module 20 is a Type 3 device in CXL 2.0. The memory module 20 is a storage medium (semiconductor memory device). The memory module 20 may be a volatile storage medium or a non-volatile storage medium. The configurations of the memory modules 20 may be different from one another. In the following, a case will be described in which each of the memory modules 20_0 to 20_3 is a solid state drive (SSD) mounted with a NAND-type flash memory as a non-volatile memory. The SSD is an example of a storage device. The NAND-type flash memory is a memory having a relatively low durability (hereinafter also referred to as "low endurance") with respect to wear. In this case, the controller 10 can perform inter-module wear leveling with respect to the memory modules 20_0 to 20_3.

The memory module 20 includes a memory decoder 21, a memory controller 22, and a memory 23.

The memory decoder 21 corresponds to a host-managed device memory (HDM) decoder in CXL 2.0. The memory decoder 21 converts the host physical address HPA to a device physical address (DPA) corresponding to the memory 23 based on the interleave setting information 32 received from the controller 10. For example, the memory decoder 21 converts discontinuous host physical addresses HPA that have been divided by the interleaving to a continuous device physical address.

The memory controller 22 controls the entirety of the memory module 20. The memory controller 22 manages the memory region of the memory 23. The memory controller 22 performs a write operation, a read operation, or an erase operation based on the signal received from the controller 10. For example, the memory controller 22 transmits information relating to the amount of accumulated wear to the controller 10.

The memory 23 includes, for example, a plurality of NAND flash memories. The memory 23 can include a plurality of memory chips. In this case, the memory chips can be operated independently of one another.

1.1.3 Logical Configuration of Memory Module

Next, an example of a logical configuration of the memory 23 of the memory module 20 will be described with reference to FIG. 2. FIG. 2 is a block diagram showing a logical configuration of the memory 23 of the memory module 20.

As shown in FIG. 2, the memory 23 of each memory module 20 is virtually divided into, for example, two logical devices LD. Each memory 23 may include a discretionary number of logical devices LD. The memory 23 may be a single logical device LD. In the following description, in a case of distinguishing the logical devices LD of the memory modules 20_0 to 20_3 from one another, the two logical devices LD of the memory module 20_0 are referred to as logical devices LD0 and LD1. The two logical devices LD of the memory module 20_1 are referred to as logical devices LD2 and LD3. The two logical devices LD of the memory module 20_2 are referred to as logical devices LD4 and LD5. The two logical devices LD of the memory module 20_3 are referred to as logical devices LD6 and LD7.

Each logical device LD is divided into a plurality of chunks CK. The chunk CK is a unit of the memory region corresponding to the interleave. In other words, the data size of the chunk CK is interleave granularity. For example, assuming that the memory region in which data is collectively written in one write operation is defined as "a page", the data size (the interleave granularity) of the chunk CK is larger than the data size of the page. That is, the chunk CK includes a plurality of pages. In the example shown in FIG. 2, each logical device LD includes eight chunks CK0 to CK7.

1.2 Specific Example of Wear Counter Table

A specific example of the wear counter table 31 will be described with reference to FIG. 3. FIG. 3 is a table showing a specific example of the wear counter table 31.

As shown in FIG. 3, the wear counter table 31 includes information on the amount of accumulated wear and the storage capacity of each logical device LD. For example, the amount of accumulated wear is the sum of a product of the amount of wear due to one write operation and the number of write operations and a product of the amount of wear due to one read operation and the number of read operations. The amount of wear due to one write operation is different from the amount of wear due to one read operation. In the example of FIG. 3, the amount of accumulated wear in the logical device LD0 is 1000. The amount of accumulated wear in the logical device LD1 is 30. The amount of accumulated wear in the logical device LD2 is 5000. The amount of accumulated wear in the logical device LD3 is 2500. The storage capacity of all the logical devices LD0, LD1, LD2, and LD3 is 1 TB. In the example of FIG. 3, a case has been described in which the wear counter table 31 stores information relating to the amount of accumulated wear for each logical device LD. However, the wear counter table 31 is not limited to this case. The wear counter table 31 may store information relating to the amount of accumulated wear for each memory module 20 or for each chunk CK, or for each device physical address, namely, for each page.

1.3 Specific Example of Interleave Setting Information

Next, a specific example of the interleave setting information 32 will be described with reference to FIG. 4. FIG. 4 is a table showing a specific example of the interleave setting information 32. The example of FIG. 4 shows the interleave setting information 32 corresponding to one system decoder 11 (host device 2). The controller 10 has interleave settings for different system decoders 11, respectively.

As shown in FIG. 4, the interleave setting information 32 includes, for example, information of the number of interleaves IW (also referred to as the number of interleave ways IW), the interleave granularity IG (that is, the size of a chunk CK), and a target logical device LD (hereinafter also referred to as "the target LD"). In the following, a combination of the number of interleaves IW, the interleave granularity IG, and the target logical device LD is indicated as an interleave set IS. For example, the interleave set IS is compliant with the CXL standard. The interleave setting information 32 can include a plurality of interleave sets IS respectively corresponding to the system decoders 11.

A copy-on-write process is applied to the wear leveling of the present embodiment. In a case of the copy-on-write process, data is stored in the logical device LD corresponding to the interleave set IS before updating, until the moving of data (copying) is completed. Therefore, before the copy-on-write process is completed, the interleave set IS before updating (before execution of wear leveling) and the interleave set IS after updating (after execution of wear leveling) may be stored in the buffer 14. The interleave set IS before updating may be saved in a memory region other than the buffer 14.

In the example of FIG. 4, before updating, the number of interleaves IW is 1 and the interleave granularity IG is 1 KB. The target logical device LD is LD0. After updating, the number of interleaves IW is 4 and the interleave granularity IG is 1 KB. The target logical devices LD change as LD3-LD4-LD2-LD6. This means that the chunks CK of the logical devices LD3, LD4, LD2, and LD6 are repeatedly selected in this order. In the example of FIG. 4, the target logical devices LD do not include the logical device LD1 included in the memory module 20_0, which includes the logical device LD0, but may include the logical device LD1.

1.4 Specific Example of Copy State Table

A specific example of the copy state table 33 will be described with reference to FIG. 5. FIG. 5 is a table showing a specific example of the copy state table 33.

As shown in FIG. 5, the copy state table 33 corresponds to a plurality of interleave sets IS. In the example of FIG. 5, the copy state table 33 corresponds to three interleave sets IS. The number of wear leveling operations that can be executed simultaneously is based on an identification number ID of the interleave set IS in the copy state table 33.

The copy state table 33 includes information on a copy size and a copy flag corresponding to each of the identification numbers ID0 to ID2 of the interleave sets IS. The copy size is a unit of data movement in wear leveling. In other words, the copy size is a unit of management of wear leveling. The copy size can be set to an integral multiple of the interleave granularity IG. For example, the copy size may be the same as the size of a chunk CK. For example, the copy size indicates a multiple of the interleave granularity IG. In the example of FIG. 5, the copy size of the interleave set IS ID0 is 1. This means that the copy size is 1 times the interleave granularity IG. The copy size of the interleave set IS ID1 is 16. The copy size of the interleave set IS ID4 is 4.

The copy flag is a flag indicating a copy status of each unit of management of wear leveling (whether copying has been completed or not). For example, in a case where the copy size is the same as the size of a chunk CK, information of one bit corresponds to one chunk CK. In the example of FIG. 5, "1" indicates copying completed, and "0" indicates copying not completed. If all the copy flags are "1", the system management unit 12 determines that the copy-on-write process has been completed. In other words, the system management unit 12 determines that the wear leveling has ended. The copy flags may be compressed.

1.5 Interleave Setting Update Process

Next, an example of an interleave setting update process will be described. The interleave setting update process is an operation executed when wear leveling is activated.

1.5.1 Flow of Interleave Setting Update Process

Figure 6:
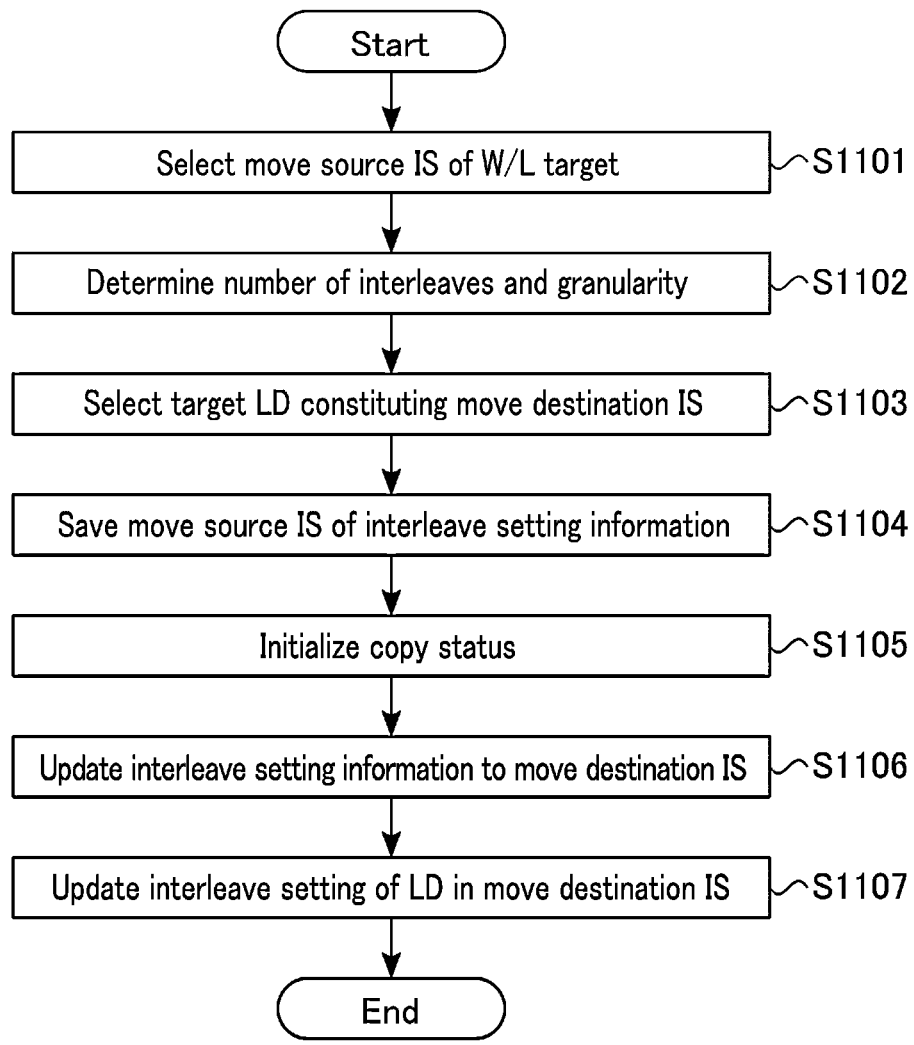
FIG. 6 is a flowchart of an interleave setting update process in the memory system according to the first embodiment.

First, an example of a flow of the interleave setting update process will be described with reference to FIG. 6. FIG. 6 is a flowchart of the interleave setting update process.

As shown in FIG. 6, upon determination of activation of wear leveling, the system management unit 12 first selects an interleave set IS which is a target of the wear leveling (W/L) (hereinafter referred to as "the move source IS") (S1101). For example, if the unevenness in the amounts of accumulated wear among the logical devices LD comes to a preset threshold value or larger, the system management unit 12 selects an interleave set IS in which the amount of accumulated wear is the largest as a move source interleave set IS. Alternatively, if the amount of accumulated wear in the logical device LD corresponding to an interleave set IS comes to a preset threshold value or larger, with reference to the wear counter table 31, the system management unit 12 selects the interleave set IS as a move source interleave set IS.

The system management unit 12 determines the number of interleaves IW and the interleave granularity IG of a move destination (S1102).

The system management unit 12 selects target logical devices LD corresponding to a move destination interleave set IS (S1103). Thus, the configuration of the interleave set IS of the move destination (after updating) is determined.

The system management unit 12 saves the interleave set IS of the move source (before updating) of the interleave setting information 32 (S1104). For example, the system management unit 12 saves the interleave set IS of the move source (before updating) of the interleave setting information 32 to another memory region from the interleave setting information 32.

The system management unit 12 initializes the copy status of the copy state table 33 (S1105). More specifically, the system management unit 12 sets the copy flag corresponding to the move source interleave set IS to an all "0" state in the copy state table 33.

The system management unit 12 updates the interleave setting information 32 to the move destination interleave set IS (S1106). More specifically, the system management unit 12 updates the interleave setting information 32 to the number of interleaves IW, the interleave granularity IG, and the target logical devices LD determined in steps S1102 and S1103. For example, the system management unit 12 transmits the updated interleave setting information 32 to the system decoder 11.

The system management unit 12 transmits the updated interleave set IS to the logical devices LD corresponding to the move destination interleave set IS (hereinafter also referred to as "the move destination logical device LD"), that is, the memory modules 20, and updates the interleave setting relating to the logical devices LD (S1107).

1.5.2 Specific Example of Determination of Number of Interleaves

Figure 7:
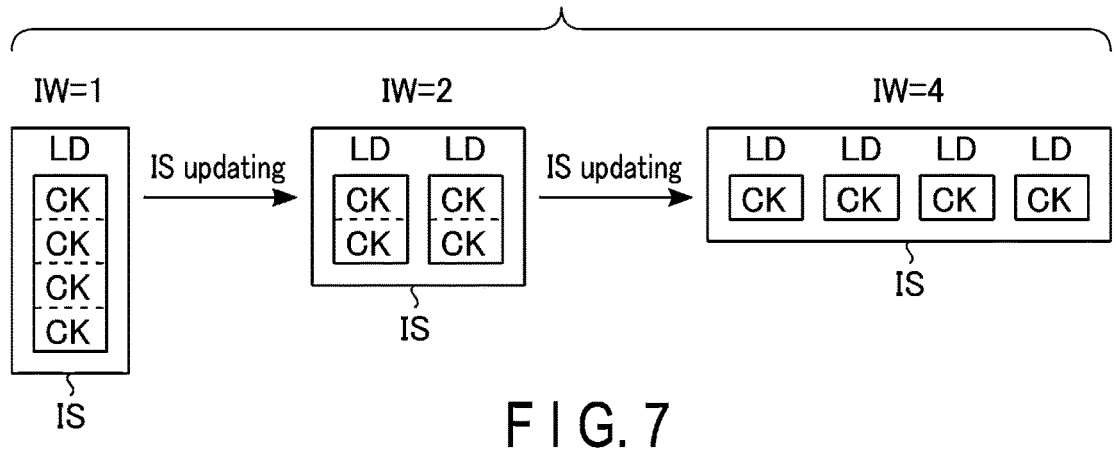
FIG. 7 is a diagram showing a specific example of determination of the number of interleaves in the memory system according to the first embodiment.
Figure 8:
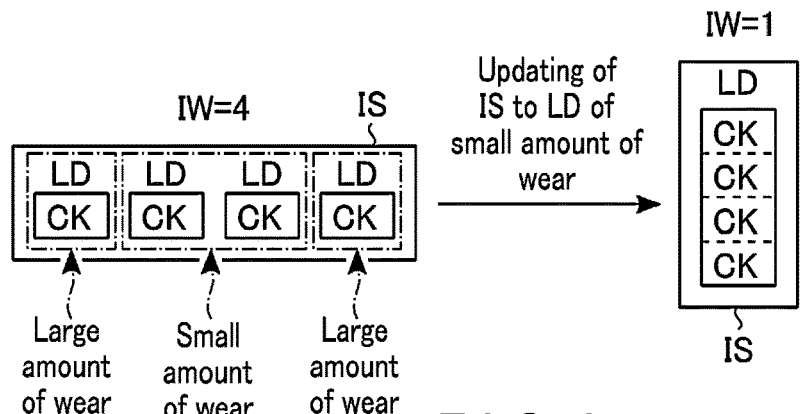
FIG. 8 is a diagram showing a specific example of determination of the number of interleaves in the memory system according to the first embodiment.

Next, a specific example of determination of the number of interleaves IW explained in step S1102 in FIG. 6 will be described with reference to FIGS. 7 and 8. FIGS. 7 and 8 are diagrams showing specific examples of determination of the number of interleaves IW.

As shown in FIG. 7, for example, the system management unit 12 may double the number of interleaves IW when the interleave set IS is updated. For example, if the number of interleaves IW of the move source interleave set IS is 1, the number of interleaves IW is updated to 2 by updating of the interleave set IS. If the number of interleaves IW of the move source interleave set IS is 2, the number of interleaves IW is updated to 4 by updating of the interleave set IS. According to CXL 2.0, the maximum number of interleaves is 8.

An increment of the number of interleaves IW may be determined in accordance with the amount of accumulated wear in the move source interleave set IS. For example, the number of interleaves IW may be updated from 1 to 4, as in the case of the interleave setting information 32 described above with reference to FIG. 4.

As shown in FIG. 8, in a case where there is unevenness in the amounts of accumulated wear in the logical devices LD corresponding to the move source interleave set IS, the system management unit 12 may reduce the number of interleaves IW and move data to a logical device LD in which the amount of accumulated wear is small. As a result, the amounts of accumulated wear can be leveled among the logical devices LD. For example, if the number of interleaves IW of the move source interleave set IS is 4, the number of interleaves IW is updated to 1 by updating of the interleave set IS.

1.5.3 Specific Example of Determination of Interleave Granularity

Figure 9:
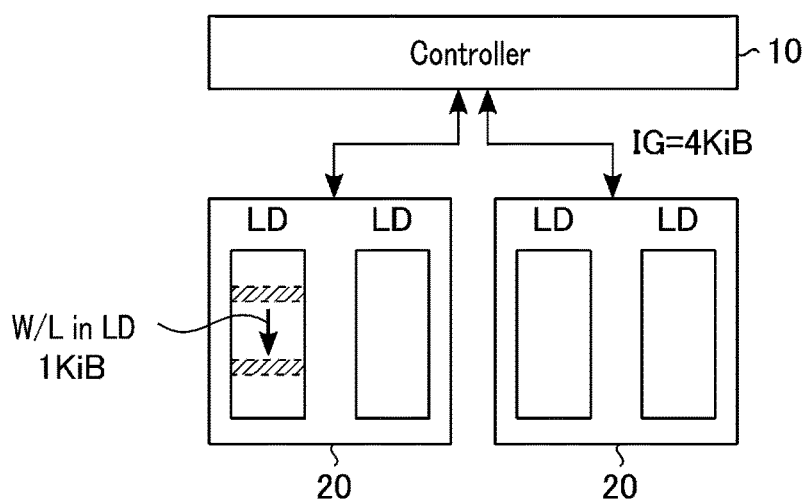
FIG. 9 is a diagram showing a specific example of determination of interleave granularity in the memory system according to the first embodiment.

Next, a specific example of determination of the interleave granularity IG explained in step S1102 in FIG. 6 will be described with reference to FIG. 9. FIG. 9 is a diagram showing a specific example of determination of the interleave granularity IG.

As shown in FIG. 9, for example, the interleave granularity IG is an integral multiple of the unit of data movement in wear leveling executed in the logical device LD (or the memory module 20). In the example of FIG. 9, the size of the data movement (granularity) of wear leveling in the logical device LD is 1 KiB. On the other hand, the interleave granularity IG of inter-module wear leveling is four times that in the logical device, that is, 4 KiB. In this case, the memory module 20 may present to the controller 10 a desirable granularity as the granularity of wear leveling in the logical device LD or the interleave granularity IG as designated vendor-specific extended capabilities (DVSEC).

1.5.4 Selection of Target Logical Device LD

Next, an example of a flow of the selection of the target logical device LD explained in step S1103 in FIG. 6 will be described with reference to FIG. 10. FIG. 10 is a flowchart of selection of the target logical device LD.

As shown in FIG. 10, the system management unit 12 checks whether there is an unused logical device LD (S1201). For example, the system management unit 12 checks whether there is a logical device LD that is not allocated to any interleave set IS, namely, an unused logical device LD.

If there is an unused logical device LD (S1201_Yes), the system management unit 12 selects, as a target logical device LD from among all unused logical devices LD, a logical device LD in which the amount of accumulated wear is the smallest (S1202).

The system management unit 12 checks whether allocation of an unused logical device LD to the target logical device LD has been completed (S1203). If allocation to all target logical devices LD has been completed (S1203_Yes), the system management unit 12 ends the selection of the target logical device LD. On the other hand, if there is a target logical device LD for which allocation has not been completed (S1203_No), the system management unit 12 proceeds to step S1201 and checks whether there is an unused logical device LD.

In step S1201, if there is no unused logical device LD (S1201_No), the system management unit 12 executes an allocation error process (S1204). As the allocation error process, the system management unit 12 may stand by for a certain period of time until an unused logical device LD is secured. The system management unit 12 may cause the memory module 20 to execute garbage collection to secure an unused logical device LD. Alternatively, the system management unit 12 may cancel the wear leveling process. After the allocation error process, the system management unit 12 proceeds to step S1201, and checks whether there is an unused logical device LD.

1.6 Copy-on-write Process

Next, the copy-on-write process will be described.

1.6.1 Flow of Copy-on-write Process

Figure 11:
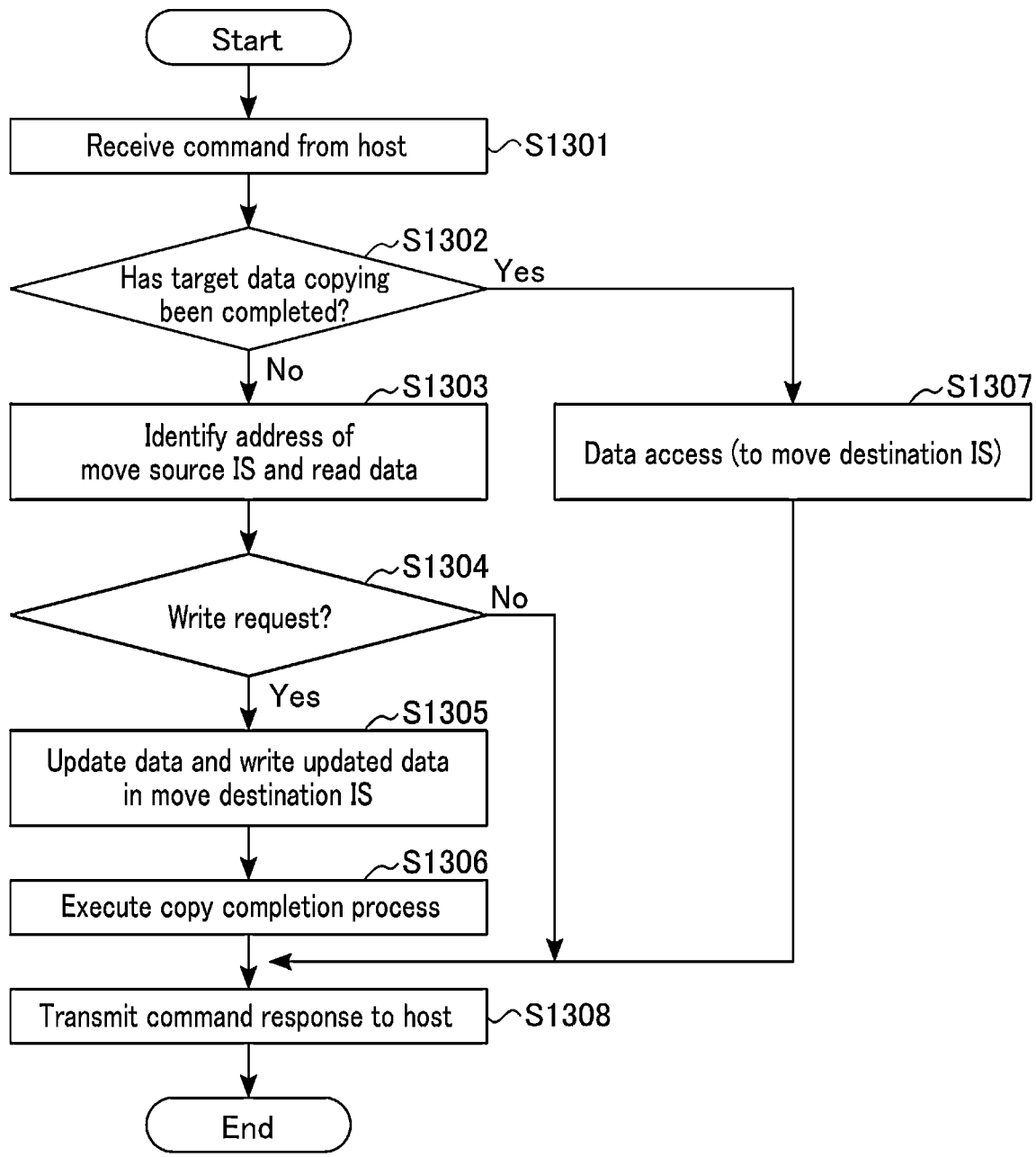
FIG. 11 is a flowchart of a copy-on-write process in the memory system according to the first embodiment.

First, an example of the flow of the copy-on-write process will be described with reference to FIG. 11. FIG. 11 is a flowchart of the copy-on-write process. FIG. 11 shows a case in which an access request (write request or read request) from the host device 2 is executed after execution of the wear leveling.

As shown in FIG. 11, the memory system 3 receives a command (access request) from the host device 2 (S1301). The command is, for example, a command corresponding to the write request or the read request.

The system management unit 12 refers to the copy state table 33 and checks whether target data has been copied from a logical device LD corresponding to the move source interleave set IS (hereinafter referred to as "the move source logical device LD") to a move destination logical device LD (S1302). That is, the system management unit 12 checks whether there is data in a target chunk CK of the move destination logical device LD.

If the target data has not been copied (S1302_No), the system management unit 12 identifies a target address of the move source interleave set IS storing the target data, and reads the data (S1303). That is, the system management unit 12 identifies the address where the data of the move source logical device LD is stored, and reads the data.

The system management unit 12 checks whether the command is a command of the write request (S1304).

If the command is a command of the write request (S1304_Yes), the system management unit 12 updates the read data based on write data received from the host device 2. The system management unit 12 writes the updated data in the move destination logical device LD (S1305).

Upon ending of the write operation, the system management unit 12 executes a copy completion process (S1306). The copy completion process is an operation of updating the copy state table 33.

If the command is not a command of the write request (S1304_No), that is, if the command is a command of the read request, the system management unit 12 directly proceeds to S1308.

In step S1302, if the target data has been copied from the move source logical device LD to a move destination logical device LD (S1302_Yes), the system management unit 12 accesses data in the target address of the move destination logical device LD (S1307). For example, if the command is a command of the read request, the system management unit 12 reads data in the target address of the move destination logical device LD. If the command is a command of the write request, the system management unit 12 writes data in the move destination logical device LD.

The system management unit 12 transmits to the host device 2 a command response reporting that the process corresponding to the command has been completed. For example, in a case of the read request, the system management unit 12 transmits read data to the host device 2 as the command response.

1.6.2 Specific Example of Copy-on-Write Process

Figure 12:
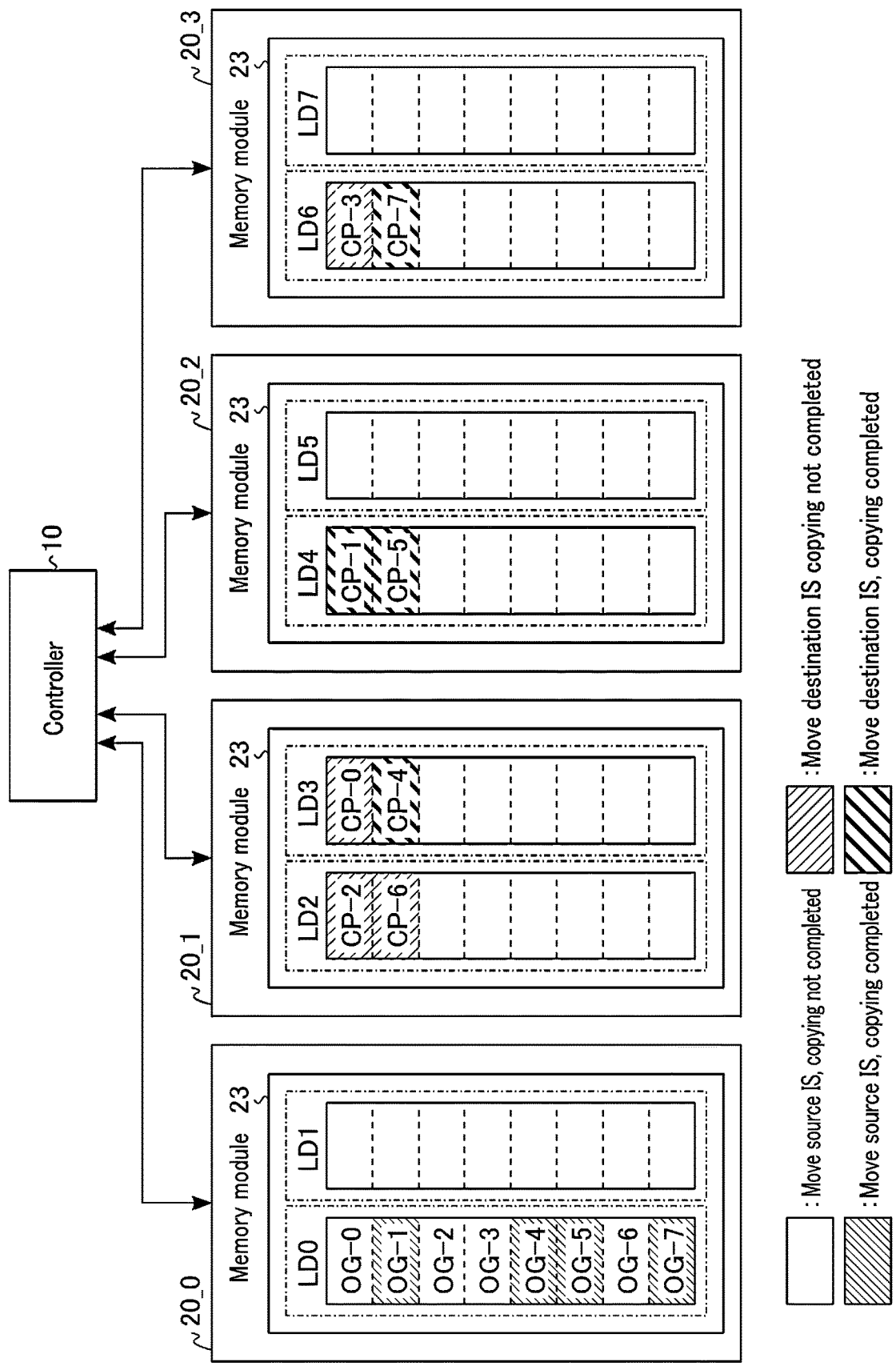
FIG. 12 is a configuration diagram of logical devices showing a specific example of the copy-on-write process in the memory system according to the first embodiment.

Next, a specific example of the copy-on-write process will be described with reference to FIG. 12. FIG. 12 is a configuration diagram of the logical devices LD showing a specific example of the copy-on-write process. FIG. 12 shows a case in which the logical device LD0 is a move source logical device LD and the logical devices LD2, LD3, LD4, and LD6 are move destination logical devices LD which are the target logical devices LD, as shown in the interleave setting information 32 of FIG. 4. For example, the target logical device LD sequentially changes to the logical devices LD3, LD4, LD2, and LD6 in this order. In the example of FIG. 12, original data stored in chunks CK0 to CK7 of the move source logical device LD0 are represented as OG-0 to OG-7. Copy data (updated data) corresponding to the original data OG-0 to OG-7 are respectively represented as CP-0 to CP-7.

As shown in FIG. 12, the original data OG-0 to OG-7 are respectively stored in the eight chunks of the logical device LD0. In this state, upon execution of wear leveling, in the move destination logical device LD3, two chunks CK are respectively allocated to the corresponding copy data CP-0 and CP-4 based on the move destination interleave set IS. Device physical addresses of the two chunks CK are determined by the memory decoder 21 of the memory module 20_1. Therefore, device physical addresses of the chunks CK storing the original data OG-0 and OG-4 in the move source logical device LD0 may be different from the device physical addresses of the chunks CK allocated to the copy data CP-0 and CP-4 in the move destination logical device LD3. In the example of FIG. 12, the chunk CK corresponding to the copy data CP-0 in the move destination logical device LD3 is in a state of copying not completed. In this case, the copy data CP-0 has not been stored in the chunk CK corresponding to the copy data CP-0 and the original data OG-0 remains in the move source logical device LD0. The chunk CK corresponding to the copy data CP-4 is in a state of copying completed. In this case, the copy data CP-4 has been stored in the chunk CK corresponding to the copy data CP-4.

In the move destination logical device LD4, two chunks CK are respectively allocated to the corresponding copy data CP-1 and CP-5. The chunks CK corresponding to the copy data CP-1 and CP-5 are in the state of copying completed. In this case, the copy data CP-1 and CP-5 have been stored in the chunks CK corresponding to the copy data CP-1 and CP-5, respectively.

In the move destination logical device LD2, two chunks CK are respectively allocated to the corresponding copy data CP-2 and CP-6. The chunks CK corresponding to the copy data CP-2 and CP-6 are in the state of copying not completed. In this case, the copy data CP-2 and CP-6 have not been stored in the chunks CK corresponding to the copy data CP-2 and CP-6 and the original data OG-2 and OG-6 remain in the move source logical device LD0.

In the move destination logical device LD6, two chunks CK are respectively allocated to the corresponding copy data CP-3 and CP-7. The chunk CK corresponding to the copy data CP-3 is in the state of copying not completed. In this case, the copy data CP-3 has not been stored in the chunk CK corresponding to the copy data CP-3 and the original data OG-3 remains in the move source logical device LD0. The chunk CK corresponding to the copy data CP-7 is in a state of copying completed. In this case, the copy data CP-7 has been stored in the chunk CK corresponding to the copy data CP-7.

1.6.3 Specific Example of Reading Data by Identifying Address of Move Source Interleave Set Next, a specific example of reading data by identifying an address of the move source interleave set IS explained in step S1302 in FIG. 11 will be described with reference to FIG. 13. FIG. 13 is a diagram showing a specific example of reading data by identifying an address of the move source interleave set IS.

As shown in FIG. 13, for example, the system decoder 11 receives an access request including a host physical address HPA from the host device 2. If target data has not been copied from the move source logical device LD0 to the move destination logical device LD3, the system decoder 11 refers to the move source interleave set IS and transmits the host physical address HPA to the move source logical device LD0 (memory module 20_0). The memory decoder 21 of the memory module 20_0 identifies a device physical address from the host physical address HPA. The memory controller 22 of the memory module 20_0 reads data which has not been copied from a page corresponding to the device physical address of the logical device LD0 (hereinafter also referred to as "uncopied data") and transmits the read data to the controller 10.

If the request from the host device 2 is a write request, the read data of the move source logical device LD0 is updated based on the write data received from the host device 2, and the updated data (and the host physical address HPA) is transmitted to the move destination logical device LD3.

1.6.4 Flow of Copy Completion Process

Next, an example of a flow of the copy completion process explained in step S1306 in FIG. 11 will be described with reference to FIG. 14. FIG. 14 is a flowchart of the copy completion process.

As shown in FIG. 14, upon copying data of the move source logical device LD, the system management unit 12 updates the copy status in the copy state table 33 (S1401). For example, the system management unit 12 updates a copy flag corresponding to the chunk CK for which copying has been executed from "0" (copying not completed) to "1" (copying completed).

The system management unit 12 refers to the copy state table 33 and checks whether all data in the move source interleave set IS have been copied (S1402). That is, the system management unit 12 checks whether copy flags corresponding to the move source interleave set IS are all "1".

If copying of all data has been completed (S1402_Yes), the system management unit 12 deletes the move source interleave set IS (S1403).

Next, the system management unit 12 deletes information of the identification number ID corresponding to the move source interleave set IS from the copy state table 33 (S1404).

In step S1402, if copying of all data has not been completed (S1402 No), the system management unit 12 ends the copy completion process without executing a further process. That is, the system management unit 12 does not delete information relating to the move source interleave set IS.

1.6.5 Background Copy Process

Figure 15:
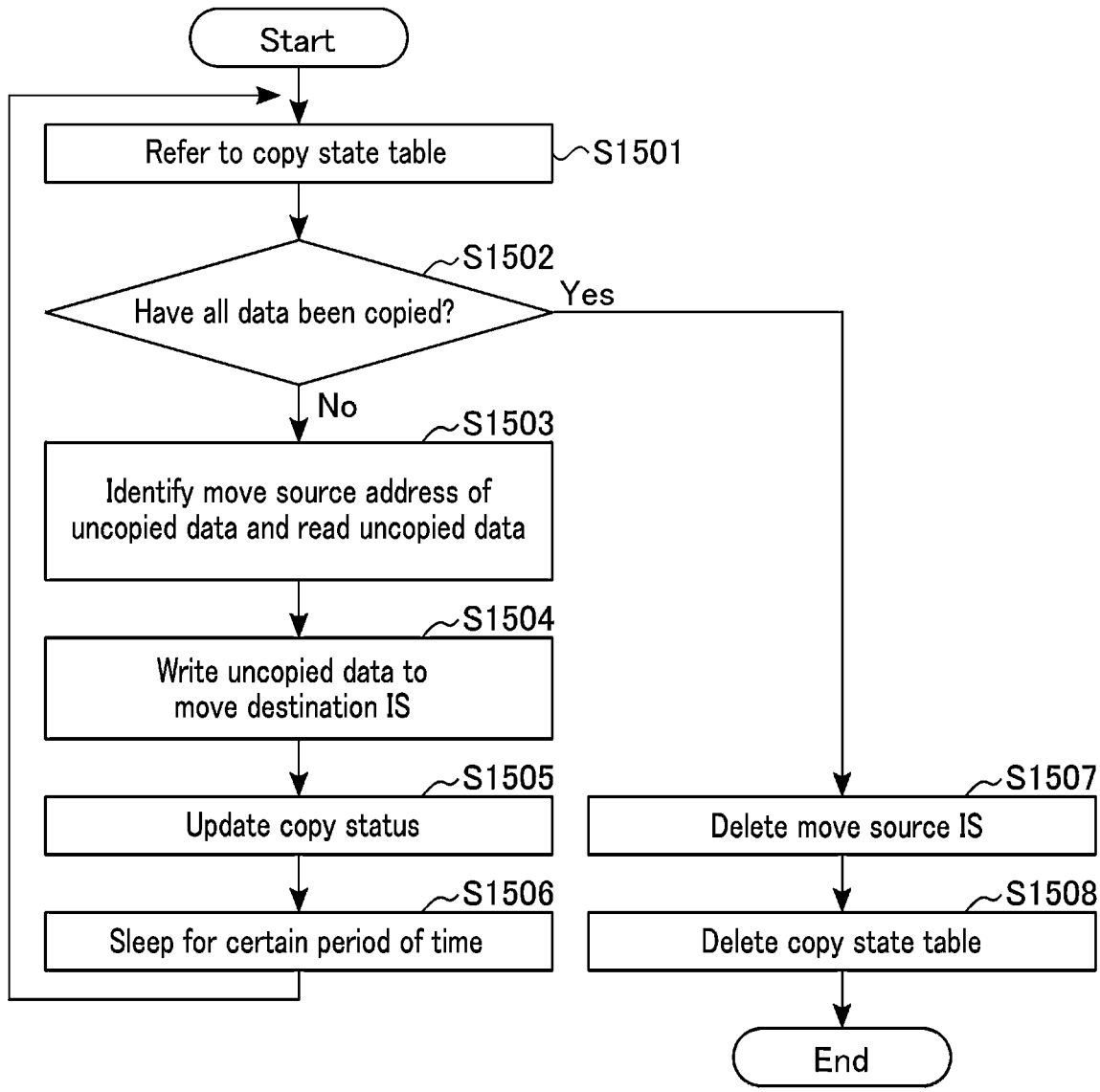
FIG. 15 is a flowchart of a background copy process in the memory system according to the first embodiment.

First, an example of the flow of a background copy process will be described with reference to FIG. 15. FIG. 15 is a flowchart of a background copy process.

For example, if there is no write request from the host device 2, uncopied data remains and the copy-on-write is not completed. That is, the wear leveling is not completed. In this case, the background copy process is executed. The background copy process is a process of copying uncopied data in the move source logical device LD to the move destination logical device LD, periodically or in a case where the memory system 3 is in a standby state. In the background copy process, for example, the uncopied data read from the move source logical device LD is directly copied to the move destination logical device LD. The system management unit 12 can update the copy status by the background copy process.

As shown in FIG. 15, the system management unit 12 refers to the copy state table 33 (S1501) and checks whether copying of all data has been completed (S1502). That is, the system management unit 12 checks whether there is incomplete wear leveling (copy-on-write process).

If copying of all data has not been completed (S1502_No), the system management unit 12 identifies an address of the move source logical device LD corresponding to the uncopied data, and reads the uncopied data from the move source logical device LD (S1503).

The system management unit 12 write the read uncopied data to the chunk CK corresponding to the move destination interleave set IS (S1504). That is, the system management unit 12 copies the uncopied data to the move destination logical device LD.

The system management unit 12 refers to the copy state table 33 and updates the copy status of the move source interleave set IS (S1505).

The system management unit 12 causes the background copy process to sleep for a certain period of time (S1506). The sleep period can be set discretionarily. For example, the sleep period can be shortened or extended in accordance with the frequency of occurrence of wear leveling. After the sleep period ends, the system management unit 12 proceeds to step S1501.

In step S1502, if copying of all data has been completed (S1502_Yes), the system management unit 12 deletes the move source interleave set IS (S1507).

Next, the system management unit 12 deletes information of the identification number ID corresponding to the move source interleave set IS from the copy state table 33 (S1508).

1.7 Advantages of Present Embodiment

In the configuration according to the present embodiment, the memory system 3 can reduce the amount of data in the wear leveling among memory modules. The effect is discussed in detail below.

For example, if wear leveling is executed among a plurality of memory modules, a mapping table is used for address management of the memory region of each memory module. The amount of data in the mapping table increases in accordance with an increase in memory. For example, if there are eight memory modules each having a storage capacity of 256 GiB, the amount of data of the mapping table corresponding thereto is 2 GiB.

In contrast, according to the configuration of the present embodiment, the controller 10 can execute inter-module wear leveling using the interleave setting information 32 and the copy state table 33. Furthermore, the controller 10 can transmit the host physical address HPA as it is to the memory module 20. Therefore, the mapping table can be omitted. Accordingly, for example, if there are eight memory modules each having a storage capacity of 256 GiB, the amount of data of the management information including the interleave setting information 32 and the copy state table 33 can be suppressed to about several tens of MiB at the maximum. Consequently, the memory system 3 can reduce the amount of data in the wear leveling among memory modules.

Furthermore, according to the configuration of the present embodiment, the copy-on-write process can be applied to the moving of data in inter-module wear leveling. In the copy-on-write process, the write operation is executed if data is updated. Therefore, the increase in a write amplification factor (WAF) due to an increase in invalid data can be suppressed. Consequently, the cost for moving of data can be reduced.

Furthermore, according to the configuration of the present embodiment, the controller 10 can dynamically change the setting of interleave sets in accordance with the state of wear in memory modules 20 in inter-module wear leveling. Wear load can be dispersed among the memory modules 20 by interleave setting to change the target logical device LD.

1.8 Modification of First Embodiment

Three modifications of the first embodiment will be described below. Hereinafter, differences from the first embodiment will be mainly described.

1.8.1 First Modification

Figure 16:
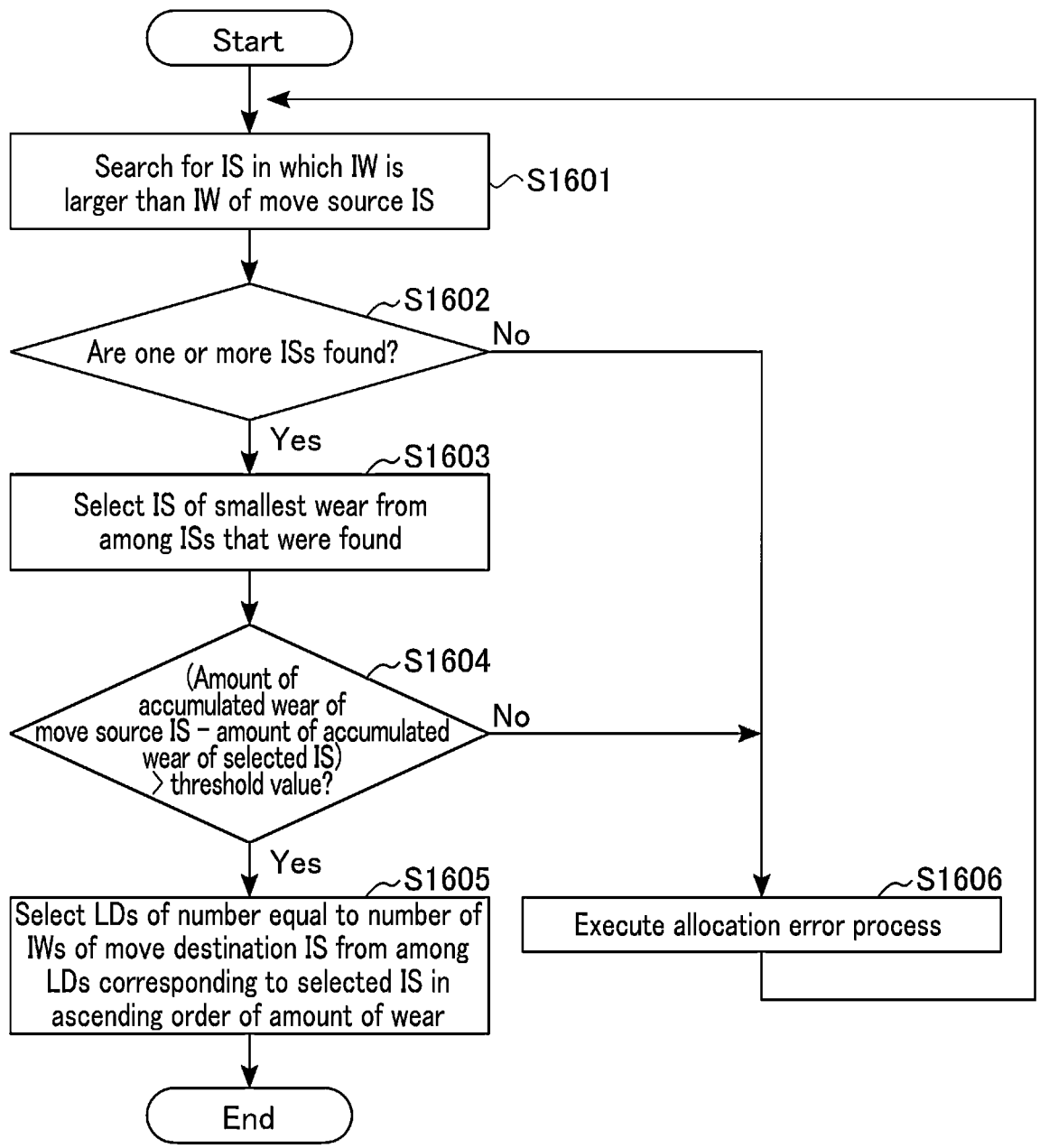
FIG. 16 is a flowchart of selection of a target logical device in the memory system according to a first modification of the first embodiment.

A first modification of the first embodiment will be described. In the following, an example of the flow of selection of a target logical device LD in the first modification that is different from the first embodiment will be described. FIG. 16 is a flowchart of selection of the target logical device LD.

As shown in FIG. 16, the system management unit 12 searches for an interleave set IS in which the number of interleaves IW is larger than the number of interleaves IW in the move source interleave set IS (S1601).

If one or more interleave sets IS are found (S1602_Yes), the system management unit 12 selects, from among the found interleave sets IS, an interleave set IS in which the amount of accumulated wear in the corresponding logical device LD is the smallest (S1603).

The system management unit 12 compares the amount of accumulated wear in the logical device LD corresponding to the move source interleave set IS (hereinafter also referred to as "the amount of accumulated wear in the move source IS") with the amount of accumulated wear in the logical device LD corresponding to the selected interleave set IS (hereinafter also referred to as "the amount of accumulated wear in the selected IS") (S1604).

If the difference between the amount of accumulated wear in the move source IS and the amount of accumulated wear in the selected IS is larger than a preset threshold value (S1604_Yes), that is, if the amount of accumulated wear in the selected IS is sufficiently smaller than the amount of accumulated wear in the move source IS, the system management unit 12 selects, from among the logical devices LD corresponding to the selected interleave set IS, logical devices LD of the number equal to the number of interleaves IW of the move destination interleave set IS, in ascending order of the amounts of accumulated wear in the logical devices LD (S1605).

If no interleave set IS is found (S1602_No), or if the difference between the amount of accumulated wear in the move source IS and the amount of accumulated wear in the selected IS is equal to or smaller than the preset threshold value (S1604_No), the system management unit 12 executes an allocation error process (S1606). As the allocation error process, the system management unit 12 may execute the selection of a target logical device LD after waiting for a certain period of time. Alternatively, the system management unit 12 may cancel the wear leveling process. After the allocation error process, the system management unit 12 proceeds to step S1601.

1.8.2 Second Modification

Figure 17:
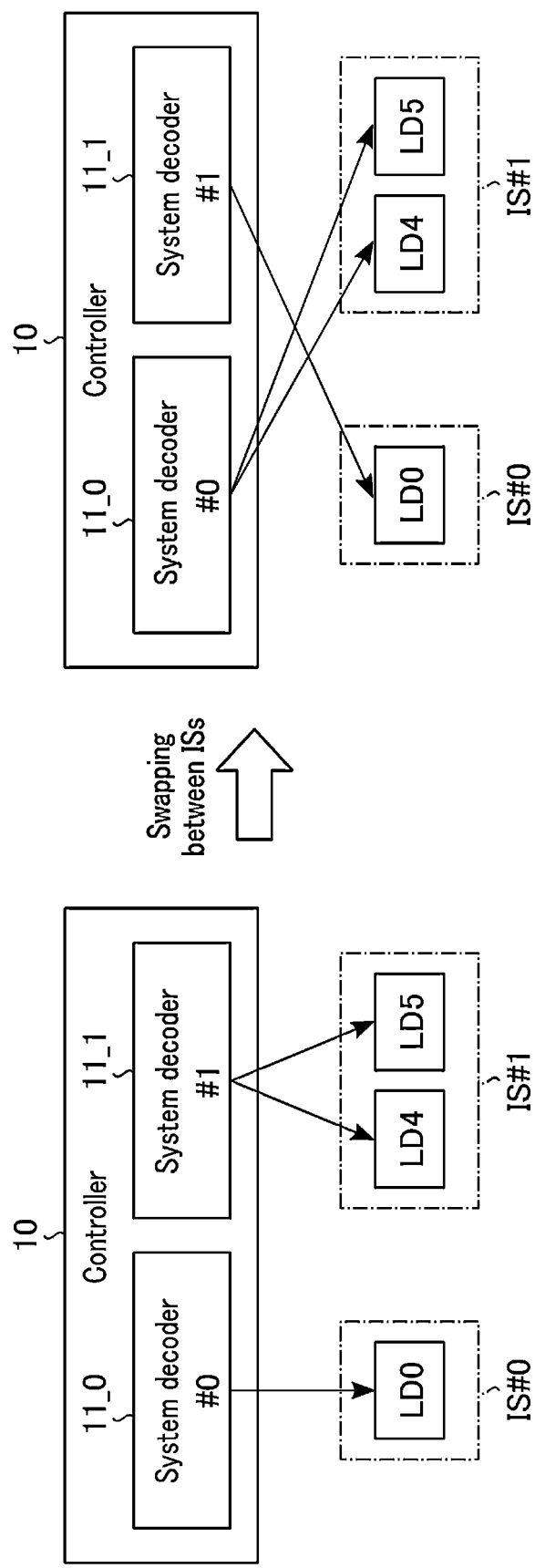
FIG. 17 is diagram for explaining selection of a target logical device in the memory system according to a second modification of the first embodiment.

Next, a second modification of the first embodiment will be described. In the following, an example of the selection of a target logical device LD in the second modification that is different from the first embodiment and the first modification of the first embodiment will be described. FIG. 17 is a diagram for explaining selection of the target logical device LD.

As shown in FIG. 17, the system management unit 12 may perform swapping between interleave sets IS associated with system decoders 11. More specifically, for example, the controller 10 include two system decoders 11_0 and 11_1. In the explanation below, the system decoder 11_0 is referred to as the system decoder #0. The system decoder 11_1 is referred to as the system decoder #1. For example, the interleave set IS #0 is associated with the system decoder #0. The system decoder #0 is coupled to the logical device LD0 corresponding to the interleave set IS #0. The interleave set IS #1 is associated with the system decoder #1. The system decoder #1 is coupled to the logical devices LD4 and LD5 corresponding to the interleave set IS #1. In this state, for example, wear leveling of the interleave set IS #0 is executed, and the interleave set IS #0 is swapped with the interleave set IS #1 in which the amount of accumulated wear is relatively small. Thus, the interleave set IS #0 is associated with the system decoder #1. The interleave set IS #1 is associated with the system decoder #0. As a result, the system decoder #0 is coupled to the logical device LD4 and LD5 corresponding to the interleave set IS #1. The system decoder #1 is coupled to the logical device LD0 corresponding to the interleave set IS #0.

1.8.3 Third Modification

Next, a third modification of the first embodiment will be described. In the third modification, an example of a case in which the memory system 3 has a power-loss protection (PLP) function will be described. FIG. 18 is a block diagram showing an overall configuration of the data processing apparatus 1.

As shown in FIG. 18, the memory system 3 includes a controller 10, a plurality of memory modules 20, a power controller 25, a capacitor 26, and a non-volatile memory 27. The configurations of the controller 10 and the memory modules 20 are the same as those of the first embodiment.

The power controller 25 controls power supply in the memory system 3. The power controller 25 supplies power to the controller 10 and the non-volatile memory 27. Upon detection of power shutdown, the power controller 25 reports the detection of the power shutdown to the controller 10, and is automatically switched to power supply from the capacitor 26.

The capacitor 26 is a capacitance element that stores charges in case of power shutdown. At the occurrence of power shutdown, the capacitor 26 supplies power to the power controller 25 under the control of the power controller 25.

The non-volatile memory 27 is, for example, a NAND-type flash memory. The non-volatile memory 27 may be a storage class memory (SCM). The non-volatile memory 27 stores data saved at the time of an occurrence of power shutdown. For example, the non-volatile memory 27 stores unwritten data in the buffer 14, various tables and information, etc. under the control of the system management unit 12. The data saved in the non-volatile memory 27 is read after the power recovery, and the state before the power shutdown is restored.

1.8.4 Advantages of First to Third Modifications

According to the configuration of the first to third modifications, advantages similar to those of the first embodiment can be achieved.

According to the first modification of the first embodiment, even if there is no unused logical device LD, a logical device LD corresponding to the interleave set IS in use can be selected as a target logical device LD. As a result, the frequency of an occurrence of an allocation error can be reduced.

According to the second modification of the first embodiment, interleave sets IS can be swapped between a plurality of system decoders 11. As a result, the unevenness in the amounts of accumulated wear can be leveled by exchanging a frequently used interleave set IS of the system decoder 11 with an interleave set IS in which the amount of accumulated wear is relatively small.

According to the third modification of the first embodiment, even if power shutdown occurs, a missing of information relating to wear leveling can be suppressed.

2. Second Embodiment

Next, a second embodiment will be described. In the following, a configuration of a memory system 3 and a method of wear leveling of the second embodiment different from those of the first embodiment will be described. Hereinafter, differences from the first embodiment will be mainly described.

2.1 Configuration of Memory System

First, an example of a configuration of a memory system 3 will be described with reference to FIG. 19. FIG. 19 is a block diagram showing an overall configuration of the data processing apparatus 1.

As shown in FIG. 19, the memory system 3 includes a controller 40, a plurality of first memory modules (storage units, or memory units) 60, and a plurality of second memory modules (storage units, or memory units) 61. For example, the first memory modules 60 and the second memory modules 61 correspond to, for example, CXL memories in CXL 2.0. For example, the first memory modules 60 and the second memory modules 61 are Type 3 devices in CXL 2.0. In the example of FIG. 19, the memory system 3 includes two first memory modules 60_0 and 60_1 and four second memory modules 61_0 to 61_3.

The first memory modules 60 are high-endurance memories which have relatively high durability. For example, the first memory modules 60 are excluded from the targets of data movement sources in inter-module wear leveling. The first memory modules 60 may be selected as data movement destinations in inter-module wear leveling. In the present embodiment, a case in which the first memory modules 60 are dynamic random access memories (DRAMs) will be described. The first memory modules 60 are not limited to DRAMs. In the following, the first memory modules 60 are also referred to as DRAM modules 60. In a case where the first memory modules 60_0 and 60_1 are specified, they are respectively referred to as the DRAM #0 module 60_0 and the DRAM #1 module 60_1. The first memory modules 60 may not necessarily be provided.

The second memory modules 61 each include a low-endurance memory having a lower durability than the first memory module 60. The controller 40 executes inter-module wear leveling for the second memory modules 61. In the present embodiment, a case in which the second memory modules 61 are storage class memories will be described. The second memory modules 61 are not limited to storage class memories. For example, each of the second memory modules 61 may be an SSD mounted with a NAND-type flash memory as in the case of the memory module 20 of the first embodiment. In the following, the second memory modules 61 are also referred to as the SCM modules 61. In a case where the second memory modules 61_0, 60_1, 61_2, and 61_3 are specified, they are respectively referred to as the SCM #0 module 61_0, the SCM #1 module 61_1, the SCM #2 module 61_2, and the SCM #3 module 61_3.

The SCM modules 61 each include a wear leveling (W/L) history information management unit 62 and a wear counter 63.

The wear leveling history information management unit 62 manages history information of wear leveling executed in the SCM module 61 (hereinafter also referred to as "in-module wear leveling"). For example, the wear leveling history information management unit 62 transmits wear leveling history information to a move destination and move source determination unit 44 of the controller 40.

The wear counter 63 counts the amount of accumulated wear in a memory region (not shown) of the SCM module 61. The wear counter 63 transmits the amount of accumulated wear to a module information management unit 43 of the controller 40.

The controller 40 corresponds to a CXL switch in CXL 2.0. The controller 40 controls coupling between the host device 2 at one end and the first memory modules 60 and the second memory modules 61 at the other. The controller 40 controls allocation of the memory resources of the first memory modules 60 and the second memory modules 61. The controller 40 can virtually divide the memory region of one memory module 60 or 61. To simplify the explanation, in the following, a case in which one SCM module 61 corresponds to one logical device LD will be described.

The controller 40 can execute inter-module wear leveling. The inter-module wear leveling of the present embodiment may be executed in units of pages.

The controller 40 includes a mapping management unit 41, an inter-module wear leveling (W/L) controller 42, the module information management unit 43, the move destination and move source determination unit 44, and a buffer 45. The mapping management unit 41, the inter-module wear leveling controller 42, the module information management unit 43, the move destination and move source determination unit 44, and the buffer 45 are coupled to one another via an internal bus. Functions of the mapping management unit 41, the inter-module wear leveling controller 42, the module information management unit 43, and the move destination and move source determination unit 44 may be implemented by a program executed by a central processing unit (CPU) in the controller 40, or may be configured by separate circuits.

The mapping management unit 41 manages a mapping table 51 indicating a set of a host physical address HPA, a module identifier, and a logical address corresponding to the host physical address HPA. That is, the controller 40 of the present embodiment converts a host physical address HPA to a logical address, and transmits it to each of the modules (the DRAM modules 60 and the SCM modules 61). In each module, the logical device is converted to a device physical address.

The inter-module wear leveling controller 42 detects unevenness in the amounts of accumulated wear among the SCM modules 61, and executes wear leveling and a mapping update process corresponding thereto.

The module information management unit 43 manages module management information 52 relating to an amount of accumulated wear, a storage capacity, a wear leveling cycle, and wear leveling granularity in each SCM module 61.

The move destination and move source determination unit 44 determines a move source page and a move destination page in wear leveling based on the module management information 52 and the wear leveling history information of each SCM module 61.

The buffer memory 45 is a volatile memory. For example, the buffer 45 is an SRAM. The buffer 45 temporarily stores data. The buffer 45 stores the mapping table 51 and the module management information 52. The buffer 45 may store the wear leveling history information received from each SCM module 61.

2.2 Specific Example of Mapping Table

A specific example of the mapping table 51 will be described with reference to FIG. 20. FIG. 20 is a table showing a specific example of the mapping table 51.

As shown in FIG. 20, an index, a module identifier, and a logical address are stored in each entry of the mapping table 51. The index corresponds to a host physical address HPA. For example, if the host physical address HPA is 0x3e5268cd, the index is indicated as 0x3e526. The module identifier is an identifier that identifies any one of the DRAM modules 60 and the SCM modules 61. For example, if the module identifier 22 corresponds to the SCM #2 module 61_2, a logical address 0x1234 associated with the index 0x3e526 is transmitted to the SCM #2 module 61_2.

2.3 Specific Example of Module Management Information

Next, a specific example of the module management information 52 will be described with reference to FIG. 21. FIG. 21 is a table showing a specific example of the module management information 52.

As shown in FIG. 21, the module management information 52 includes information relating to an amount of accumulated wear, a storage capacity, a wear leveling cycle (W/L cycle), and wear leveling granularity (W/L granularity) for each SCM module 61. The wear leveling cycle is a cycle of in-module wear leveling. The wear leveling granularity is a copy data size in in-module wear leveling. In the example of FIG. 21, the amount of accumulated wear in the SCM #0 module 61_0 is 1000. The storage capacity thereof is 1 TB. The wear leveling cycle thereof is 1000. The wear leveling granularity thereof is 1 KB. The amount of accumulated wear in the SCM #1 module 61_1 is 30. The storage capacity thereof is 1 TB. The wear leveling cycle thereof is 300. The wear leveling granularity thereof is 4 KB. The amount of accumulated wear in the SCM #2 module 61_2 is 5000. The storage capacity thereof is 1 TB. The wear leveling cycle thereof is 2000. The wear leveling granularity thereof is 128 B. The amount of accumulated wear in the SCM #3 module 61_3 is 2500. The storage capacity thereof is 1 TB. The wear leveling cycle thereof is 5000. The wear leveling granularity thereof is 128 B. In the example of FIG. 21, a case in which the module management information 52 includes information relating to the amount of accumulated wear for each SCM module 61 has been described; however, the embodiment is not limited thereto. The module management information 52 may include information relating to the amount of accumulated wear for each page.

2.4 Specific Example of Wear Leveling History Information

Next, a specific example of the wear leveling history information will be described with reference to FIG. 22. FIG. 22 is a table showing a specific example of the wear leveling history information. The example of FIG. 22 shows wear leveling history information of one SCM module 61.

As shown in FIG. 22, in the wear leveling history information, an entry corresponding to the in-module wear leveling executed in the SCM module 61 is generated. For example, the number of entries of the wear leveling history information is equal to the number of times of in-module wear leveling executed in the SCM module 61. In each entry, a logical address of a page in which the in-module wear leveling has been executed is recorded. Thus, the wear leveling history information is a list of logical addresses at which the wear leveling has been executed. The wear leveling history information management unit 62 of each module stores a logical address as the wear leveling history information, so that it can easily share address information with the module information management unit 43 of the controller 40. In the example of FIG. 22, N entries 0 to N−1 are generated (N is an integer of 0 or more). For example, the logical address of the entry 0 is 0x100. The logical address of the entry 1 is 0x002. The logical address of the entry N−1 is 0x356.

The wear leveling history information may include a time stamp relating to the time at which the wear leveling has been executed. In this case, the move source page of the inter-module wear leveling may be selected in view of the temporal locality of execution of in-module wear leveling. More specifically, a page of the SCM module 61 for which wear leveling is intensively repeated in a relatively short period of time may be selected as the move source page.

2.5 Flow of Moving of Data in Wear Leveling

Figure 23:
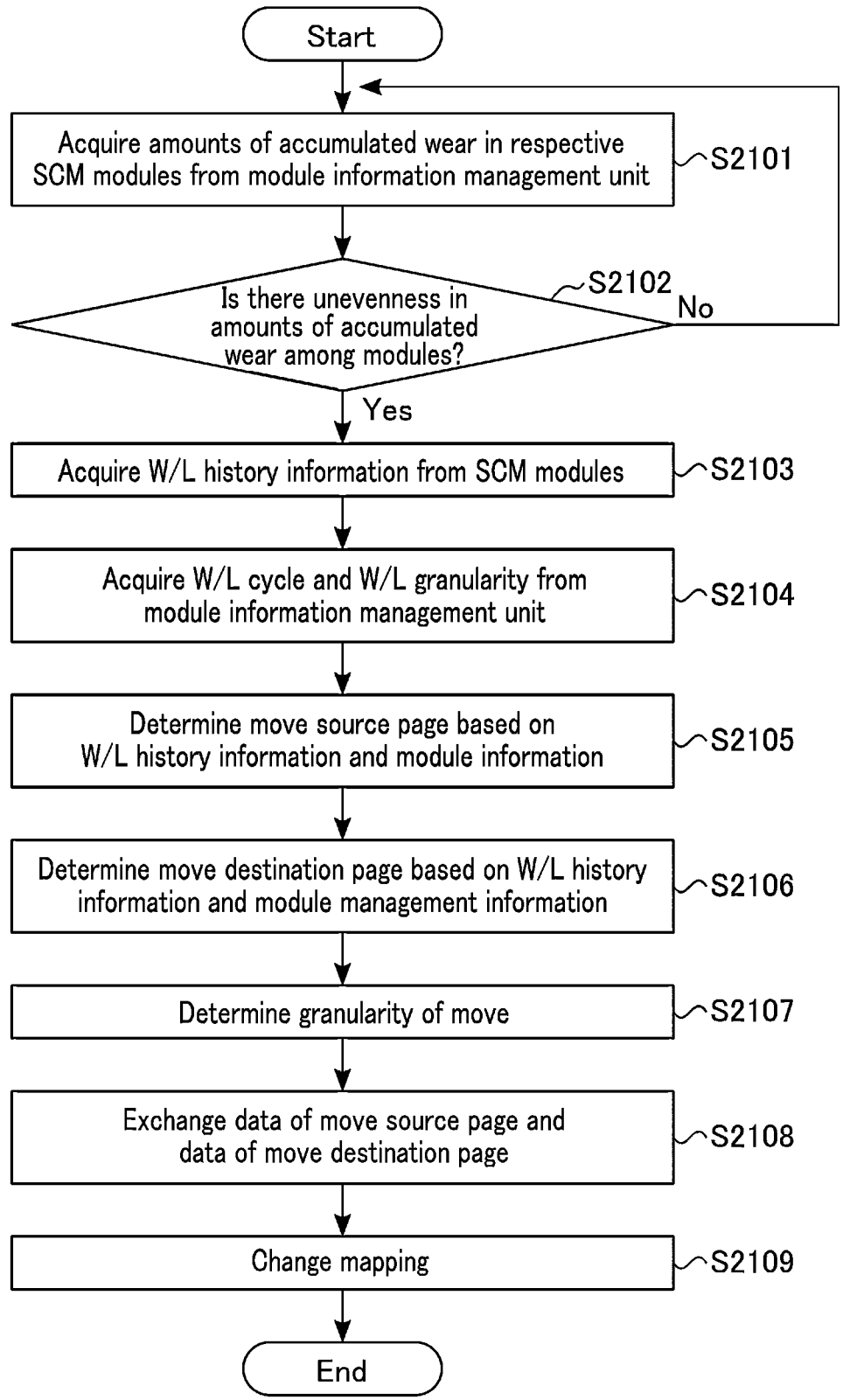
FIG. 23 is a flowchart showing moving of data in wear leveling in the memory system according to the second embodiment.

Next, an example of a flow of moving of data in wear leveling will be described with reference to FIG. 23. FIG. 23 is a flowchart showing moving of data in wear leveling.

As shown in FIG. 23, the move destination and move source determination unit 44 acquires information relating to the amounts of accumulated wear in the respective SCM modules 61 from the module information management unit 43 (S2101).

The move destination and move source determination unit 44 checks whether there is unevenness in the amounts of accumulated wear among modules (S2102). That is, the move destination and move source determination unit 44 checks whether the variation in the amounts of accumulated wear in the respective SCM modules 61 is equal to or larger than a preset threshold value.

If there is no unevenness in the amounts of accumulated wear (S2102_No), the move destination and move source determination unit 44 proceeds to step S2101. If there is unevenness in the amounts of accumulated wear (S2102_Yes), the move destination and move source determination unit 44 acquires wear leveling history information from the respective SCM modules 61 (S2103). That is, upon detection of the unevenness in the amounts of accumulated wear, the move destination and move source determination unit 44 acquires wear leveling history information from the respective SCM modules 61.

Next, the move destination and move source determination unit 44 acquires information relating to the wear leveling cycle and the wear leveling granularity of each SCM module 61 from the module information management unit 43 (S2104). The module information management unit 43 transmits the information relating to the wear leveling cycle, the wear leveling granularity, etc. of the module management information 52 to the move destination and move source determination unit 44.

The move destination and move source determination unit 44 determines a move source page based on the wear leveling history information and the module management information 52 (S2105). For example, the move destination and move source determination unit 44 selects an SCM module 61 in which the amount of accumulated wear is the largest as the move source SCM module 61. Then, the move destination and move source determination unit 44 refers to the wear leveling history information and selects a page corresponding to the logical address at which wear leveling has been executed many times as the move source page.

Next, the move destination and move source determination unit 44 determines a move destination page based on the wear leveling history information and the module management information 52 (S2106). For example, the move destination and move source determination unit 44 selects a page of an SCM module 61 in which the amount of accumulated wear is relatively small as the move destination page.

The move destination and move source determination unit 44 determines granularity of data movement in the inter-module wear leveling based on the module management information 52 (S2107). For example, the move destination and move source determination unit 44 determines, as the granularity of data movement, a lowest common multiple of the wear leveling granularity of each of the move source SCM module 61 and the move destination SCM module 61 and a mapping management granularity in the mapping table 51 of the controller 40.

The inter-module wear leveling controller 42 exchanges the data of the move source page and the data of the move destination page (S2108). The inter-module wear leveling controller 42 performs exchanging of the data in accordance with the granularity of the data movement. If the move destination page stores no data, the inter-module wear leveling controller 42 copies the data of the move source page to the move destination page.

The mapping management unit 41 changes the mapping table in accordance with the exchange of the data (S2109).

2.6 Flow of Determination of Move Source Page

Figure 24:
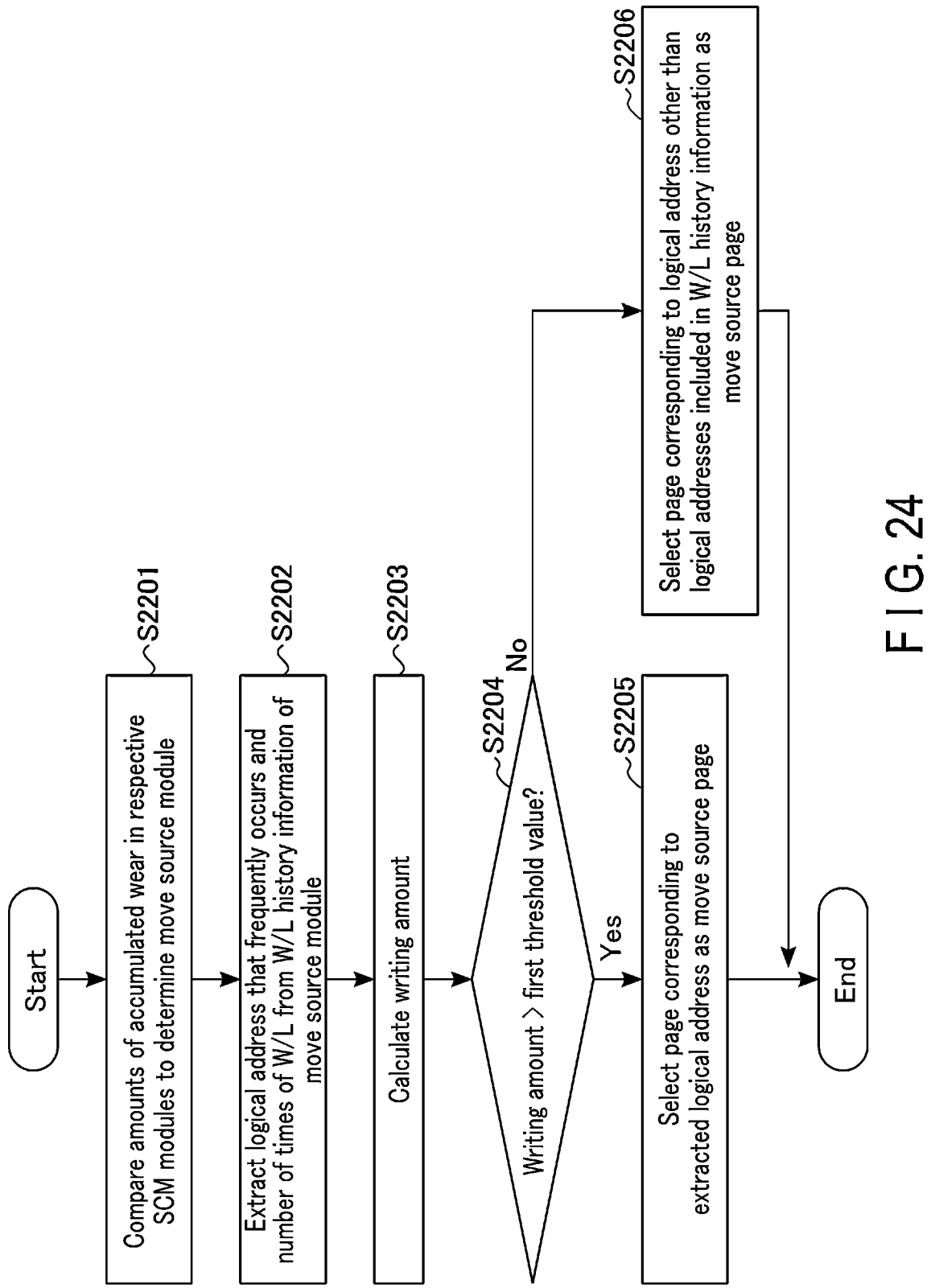
FIG. 24 is a flowchart of determination of move source page in the memory system according to the second embodiment.

Next, an example of a flow of determination of the move source page explained in step S2105 in FIG. 23 will be described with reference to FIG. 24. FIG. 24 is a flowchart of determination of the move source page.

As shown in FIG. 24, the move destination and move source determination unit 44 compares the amounts of accumulated wear in the respective SCM modules 61, to determine a move source SCM module 61 (S2201). The move destination and move source determination unit 44 selects an SCM module 61 in which the amount of accumulated wear is the largest as the move source SCM module 61.

The move destination and move source determination unit 44 refers to the wear leveling history information of the move source SCM module 61 and extracts a logical address of a page that frequency occurs in the wear leveling history information and the number of times of wear leveling (S2202). The number of times of wear leveling is the number of times of occurrence of the same logical address in the wear leveling history information.

The move destination and move source determination unit 44 calculates a writing amount of the extracted logical address (S2203). For example, the move destination and move source determination unit 44 calculates a product of the number of times of wear leveling and the wear leveling cycle as the writing amount. In the present embodiment, a case in which a writing amount is calculated is described, but the embodiment is not limited to this case. For example, an amount of accumulated wear based on a read operation or an erase operation at each logical address may be calculated, and a move source page and a move destination page may be selected based on this amount.

If the writing amount is larger than a preset first threshold value (S2204_Yes), the move destination and move source determination unit 44 selects a page corresponding to the extracted logical address as a move source page (S2205). In other words, the move destination and move source determination unit 44 selects a page in which the writing amount is larger than the first threshold value as a move source page.

If the writing amount is equal to or smaller than the preset first threshold value (S2204_No), the move destination and move source determination unit 44 selects a page corresponding to a logical address other than the logical addresses included in the wear leveling history information as a move source page (S2206). The move destination and move source determination unit 44 may select a page corresponding to a logical address included in the wear leveling history information as a move source page.

2.7 Flow of Determination of Move Destination Page

Next, an example of determination of a flow of the move destination page explained in step S2106 in FIG. 23 will be described with reference to FIG. 25. FIG. 25 is a flowchart of determination of the move destination page.

As shown in FIG. 25, the move destination and move source determination unit 44 refers to the wear leveling history information of the move source SCM module 61 and extracts a logical address of a page that frequency occurs in the wear leveling history information and the number of times of wear leveling (S2301). The operation in step S2301 is the same as that in step S2202 explained with reference to FIG. 24. Therefore, if step S2202 in FIG. 24 has been previously executed and the extraction results of the logical address and the number of times of wear leveling have been stored in the buffer 45 or the like, the move destination and move source determination unit 44 may refer to the extraction results and may omit the operation of referring to the move source SCM module 61 in step S2301.

The move destination and move source determination unit 44 calculates a writing amount of the extracted logical address (S2302). For example, the move destination and move source determination unit 44 calculates a product of the number of times of wear leveling and the wear leveling cycle as the writing amount. The operation in step S2302 is the same as that in step S2203 explained with reference to FIG. 24. Therefore, if step S2203 in FIG. 24 has been previously executed and the calculation result of the writing amount has been stored in the buffer 45 or the like, the move destination and move source determination unit 44 may refer to the calculation result and may omit the calculation process in step S2302.

If the writing amount is larger than a preset second threshold value (S2303_Yes), the move destination and move source determination unit 44 selects a DRAM module 60 as a move destination (S2304). The second threshold value is larger than the first threshold value. For example, if the writing amount is larger than the second threshold value, the move destination and move source determination unit 44 determines that access has been concentrated and the amount of accumulated wear has been significantly increased, and selects a high-endurance DRAM module 60 (first memory module 60) as the move destination.

The move destination and move source determination unit 44 determines a move destination page based on a push-out algorithm to push out data (S2305). For example, the push-out algorithm includes a least recently used (LRU) method, a least frequency used (LFU) method, etc. The LRU method is a method of pushing out data of a page that has not been referred to for the longest period of time. The LFU method is a method of pushing out data of a page that has been used least frequently. The push-out algorithm may be of any other method.

If the writing amount is equal to or smaller than the preset second threshold value (S2303_No), the move destination and move source determination unit 44 selects, as a move destination, an SCM module 61 in which the amount of accumulated wear is the smallest (S2306).

The move destination and move source determination unit 44 selects a move destination page at random from among logical addresses that are not included in the wear leveling history information of the selected SCM module 61 (S2307). A move destination page may be selected not at random. The order of selection may be determined in advance.

2.8 Advantages of Present Embodiment

In the configuration according to the present embodiment, the memory system 3 can reduce the amount of data of management information in the wear leveling among memory modules. The effect is discussed in detail below.

For example, in a case where wear leveling among a plurality of memory modules is executed, an enormous amount of memory resources is required to detect a hot page for which an amount of access is comparatively large, that is, to determine a move source page of wear leveling. For example, in a case of an SCM module having a storage capacity of 4096 GB, the amount of data of an access counter table for counting the number of accesses to each logical address is 32 GB. The amount of data of the access counter table increases in accordance with an increase in storage capacity of a memory module.

In contrast, according to the configuration of the present embodiment, the controller 40 can execute inter-module wear leveling using history information of in-module wear leveling executed in each memory module 61 and the module management information 52. Therefore, the access counter table can be omitted. By using the wear leveling history information of each memory module 61, the amount of memory resources required to determine the move source page of the wear leveling can be reduced. Consequently, the memory system 3 can reduce the amount of data of management information in the wear leveling among memory modules.

2.9 Modifications of Second Embodiment

Five modifications of the second embodiment will be described below. Hereinafter, differences from the second embodiment will be mainly described.

2.9.1 First Modification

A first modification of the second embodiment will be described. In the first modification, a case in which the wear leveling history information includes a time stamp will be described. FIG. 26 is a table showing a specific example of the wear leveling history information. Hereinafter, differences from the second embodiment shown in FIG. 22 will be described.

As shown in FIG. 26, in each entry of wear leveling history information, a logical address of a page in which the in-module wear leveling has been executed and a time stamp are recorded. In the example of FIG. 26, N entries 0 to N−1 are generated (N is an integer of 0 or more). For example, the time stamp of the entry 0 is 0. The time stamp of the entry 1 is 100. The time stamp of the entry N−1 is 5020. The time stamps of the entry 1 and the entry N−1 indicate periods of time elapsed from execution of wear leveling of the entry 0 to execution of the wear leveling corresponding to the entry.

In a case where the wear leveling history information includes information of the time stamps, the move source page can be selected in consideration of the time stamps in the flow of the move source page determination of the second embodiment described with reference to FIG. 24. For example, in step S2202 of FIG. 24, when counting the number of times of wear leveling at a logical address that occurs in the wear leveling history information, the move destination and move source determination unit 44 can execute counting in view of the temporal locality, for example, counting is not executed if the time interval of wear leveling for the same logical address is equal to or larger than a preset threshold value.

2.9.2 Second Modification

Next, a second modification of the second embodiment will be described. In the second modification, a case will be described in which a hot page is discriminated in the SCM module 61 and a logical address list indicating a hot page is transmitted to the controller 40.

2.9.2.1 Specific Example of Logical Address List

A specific example of the logical address list will be described with reference to FIG. 27. FIG. 27 is a table showing a specific example of the logical address list.

The wear leveling history information management unit 62 of each SCM module 61 of the present embodiment generates the logical address list based on the wear leveling history information. The logical address list is obtained by counting the number of times of wear leveling at each logical address for which in-module wear leveling has been executed. The wear leveling history information management unit 62 refers to the logical address list, and can discriminate a page for which the number of times of wear leveling is large as a hot page for which a write operation and a read operation have been executed frequently (that is, the writing amount is large). In other words, the logical address list is a hot page list.

As shown in FIG. 27, in each entry of the logical address list, a logical address of a page in which the in-module wear leveling has been executed and the number of times of wear leveling of the logical address are recorded. In the example of FIG. 27, N entries 0 to N−1 are generated (N is an integer of 0 or more). For example, the number of times of wear leveling at the logical address 0×100 of the entry 0 is 10. The number of times of wear leveling at the logical address 0x002 of the entry 1 is 1. The number of times of wear leveling at the logical address 0x356 of the entry N−1 is 4.

2.9.2.2 Flow of Moving of Data in Wear Leveling

Next, an example of a flow of moving of data in wear leveling will be described with reference to FIG. 28. FIG. 28 is a flowchart showing moving of data in wear leveling. Hereinafter, differences from the second embodiment shown in FIG. 23 will be described.

As shown in FIG. 28, steps S2101 and S2102 are the same as those in FIG. 23.

If there is unevenness in the amount of accumulated wear (S2102_Yes), the move destination and move source determination unit 44 acquires logical address lists of hot pages from the respective SCM modules 61 (S2120).

Step S2104 is the same as that in FIG. 23.

The move destination and move source determination unit 44 determines a move source page based on the logical address list and the module management information 52 (S2121). For example, the move destination and move source determination unit 44 selects an SCM module 61 in which the amount of accumulated wear is the largest as the move source SCM module 61 based on the module management information 52. Then, the move destination and move source determination unit 44 refers to the logical address list of the selected SCM module 61 and selects a page corresponding to the logical address at which wear leveling has been executed many times as the move source page.

Next, the move destination and move source determination unit 44 determines a move destination page based on the logical address list and the module management information 52 (S2122). For example, the move destination and move source determination unit 44 selects, as a move destination page, a page in which the number of times of executing the wear leveling is relatively small in the SCM module 61 in which the amount of accumulated wear is relatively small.

2.9.2.3 Flow of Determination of Move Source Page

Figure 29:
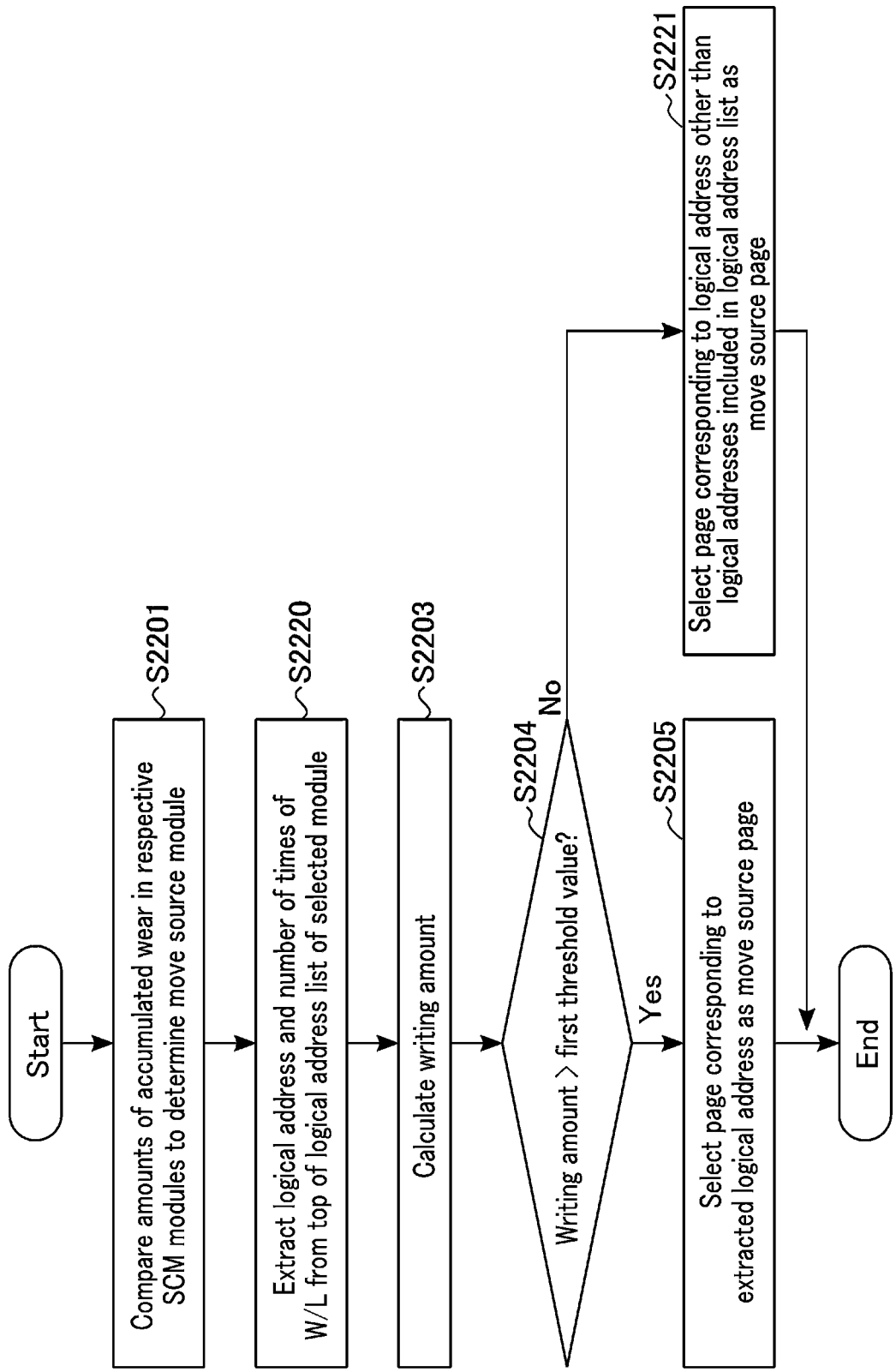
FIG. 29 is a flowchart of determination of move source page in the memory system according to the second modification of the second embodiment.

Next, an example of determination of a flow of the move source page will be described with reference to FIG. 29. FIG. 29 is a flowchart of determination of the move source page. Hereinafter, differences from the second embodiment of FIG. 24 will be mainly described.

As shown in FIG. 29, step S2201 is the same as that in FIG. 24.

After determining the move source SCM module, the move destination and move source determination unit 44 refers to the logical address list of the move source SCM module 61 and extracts a logical address of a page that frequency occurs in the wear leveling history information and the number of times of wear leveling (S2220).

The move destination and move source determination unit 44 calculates a writing amount of the extracted logical address in the same manner as shown in FIG. 24 (S2203).

If the writing amount is larger than the preset first threshold value (S2204_Yes), the move destination and move source determination unit 44 selects a page corresponding to the extracted logical address as a move source page in the same manner as shown in FIG. 24 (S2205).

If the writing amount is equal to or smaller than the preset first threshold value (S2204_No), the move destination and move source determination unit 44 selects a page corresponding to a logical address other than the logical addresses included in the logical address list as a move source page (S2206). The move destination and move source determination unit 44 may select a page corresponding to a logical address included in the logical address list as a move source page.

2.9.2.4 Flow of Determination of Move Destination Page

Next, an example of determination of a flow of the move destination page will be described with reference to FIG. 30. FIG. 30 is a flowchart of determination of the move destination page. Hereinafter, differences from the second embodiment of FIG. 25 will be mainly described.

As shown in FIG. 30, the move destination and move source determination unit 44 refers to the logical address list of the move source SCM module 61, and extracts the logical address and the number of times of wear leveling sequentially in the order from the top of the logical address list (entry 0) (S2320).

The move destination and move source determination unit 44 calculates a writing amount of the extracted logical address in the same manner as shown in FIG. 25 (S2302). For example, the move destination and move source determination unit 44 calculates a product of the number of times of wear leveling and the wear leveling cycle as the writing amount.

If the writing amount is larger than the preset second threshold value (S2303_Yes), the move destination and move source determination unit 44 executes step S2304 and step S2305 in the same manner as shown in FIG. 25.

If the writing amount is equal to or smaller than the preset second threshold value (S2303_No), the move destination and move source determination unit 44 selects, as a move destination, an SCM module 61 in which the amount of accumulated wear is the smallest in the same manner as shown in FIG. 25 (S2306).

The move destination and move source determination unit 44 selects a move destination page at random from among logical addresses that are not included in the logical address list of the selected SCM module 61 (S2321). A move destination page may be selected not at random. The order of selection may be determined in advance.

2.9.3 Third Modification

Next, a third modification of the second embodiment will be described. In the third modification, a case in which a high-load SCM module 61 is not selected as a move destination will be described. FIG. 31 is a flowchart of the move destination page determination. Hereinafter, differences from the second embodiment of FIG. 25 will be mainly described.

As shown in FIG. 31, steps S2301 to S2306 are the same as those in FIG. 25.

After step S2306, the move destination and move source determination unit 44 checks a load state of the selected SCM module 61 (S2330). The move destination and move source determination unit 44 ascertains the load state of the SCM module 61 by monitoring a band used by each SCM module 61 or acquiring load information (DevLoad) included in a response from the SCM module 61 in reply to the latest read request.

If the load of the SCM module 61 is smaller than a preset third threshold value (S2330_Yes), the move destination and move source determination unit 44 selects a move destination page at random from among pages corresponding to logical addresses that are not included in the wear leveling history information of the selected SCM module 61 in the same manner as shown in FIG. 25 (S2307). A move destination page may be selected not at random. The order of selection may be determined in advance.

If the load of the SCM module 61 is equal to or larger than the preset third threshold value (S2330_No), the move destination and move source determination unit 44 selects another SCM module 61 as a move destination (S2331). That is, the move destination and move source determination unit 44 does not select a high-load SCM module 61 as a move destination.

2.9.4 Fourth Modification

Figure 32:
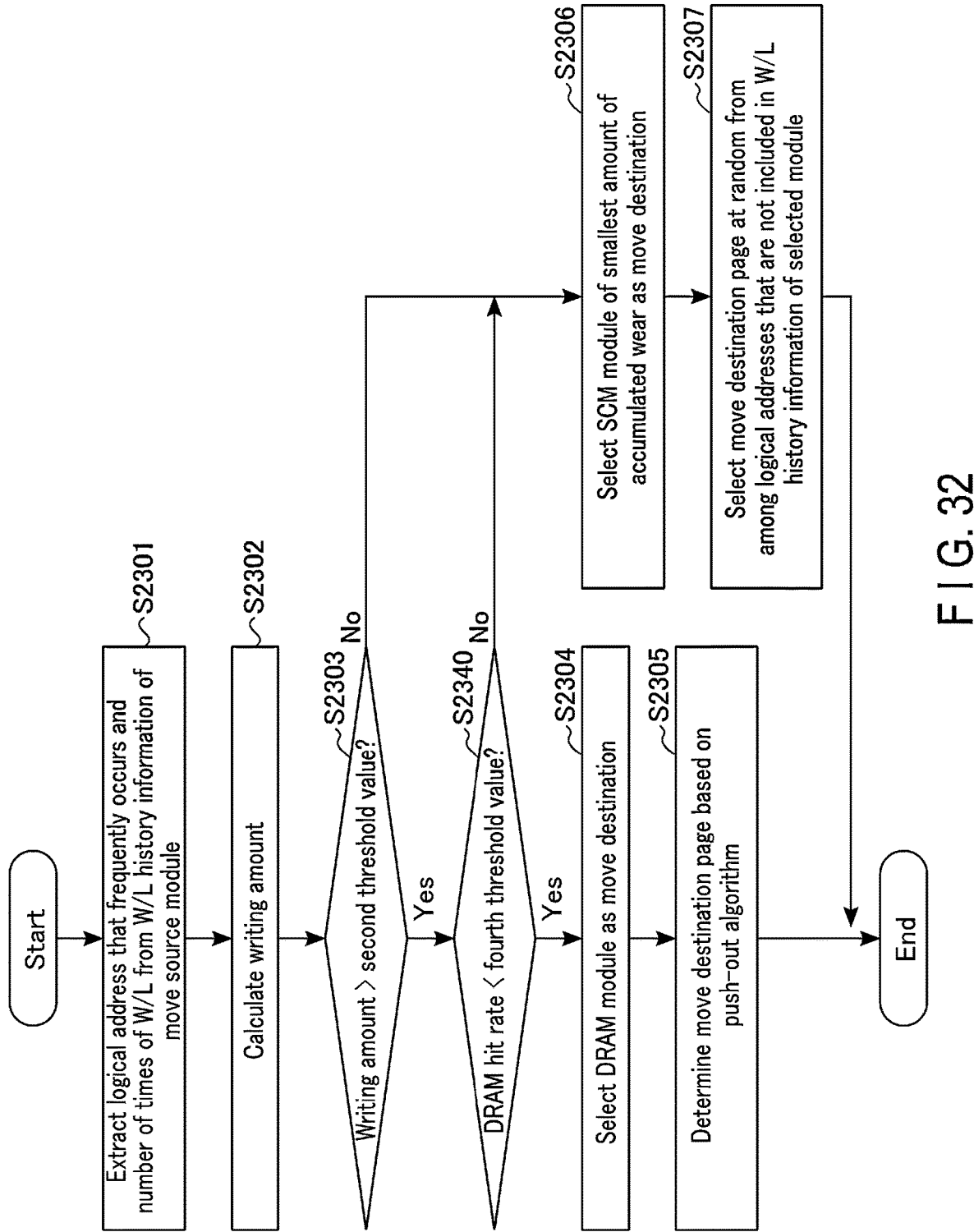
FIG. 32 is a flowchart of determination of move destination page in the memory system according to a fourth modification of the second embodiment.

Next, a fourth modification of the second embodiment will be described. In the fourth modification, a case in which a high hit-rate DRAM module 60 is not selected as a move destination will be described. A high hit-rate DRAM module 60 contributes to suppression of an increase in the amount of accumulated wear in an SCM module 61. FIG. 32 is a flowchart of determination of the move destination page. Hereinafter, differences from the second embodiment of FIG. 25 will be mainly described.

As shown in FIG. 32, steps S2301 to S2303 are the same as those in FIG. 25.

If the writing amount is larger than the preset second threshold value (S2303_Yes), the move destination and move source determination unit 44 checks a hit rate (access rate) of each DRAM module 60 (S2340). For example, the move destination and move source determination unit 44 calculates a hit rate (access rate) from a ratio of the number of accesses to a target DRAM module 60 to the total number of accesses to all of the DRAM modules 60 and the SCM modules 61.

If the hit rate of the target DRAM module 60 is smaller than a preset fourth threshold value (S2340_Yes), the move destination and move source determination unit 44 selects the DRAM module 60 as a move destination in the same manner as shown in FIG. 25 (S2204).

The move destination and move source determination unit 44 determines a move destination page based on the push-out algorithm to push out data in the same manner as shown in FIG. 25 (S2305).

If the writing amount is equal to or smaller than the preset second threshold value (S2303_No) or the hit rate of the DRAM module 60 is equal to or higher than the fourth threshold value (S2340_No), the move destination and move source determination unit 44 selects, as a move destination, an SCM module 61 in which the amount of accumulated wear is the smallest in the same manner as shown in FIG. 25 (S2306).

The move destination and move source determination unit 44 selects a move destination page at random from among pages corresponding to logical addresses that are not included in the wear leveling history information of the selected SCM module 61 in the same manner as shown in FIG. 25 (S2307).

2.9.5 Fifth Modification

Next, a fifth modification of the second embodiment will be described. In the fifth modification, a case of a data processing apparatus 1 having a configuration different from that of the second embodiment will be described. FIG. 33 is a block diagram showing an overall configuration of the data processing apparatus 1.

As shown in FIG. 33, the host device 2 may include the mapping management unit 41, the inter-module wear leveling controller 42, the module information management unit 43, and the move destination and move source determination unit 44. The other configurations are similar to those shown in FIG. 19.

2.9.6 Advantages of First to Fifth Modifications

With the configurations of the first to fifth modifications, advantages similar to those of the second embodiment can be achieved.

According to the configuration of the first modification of the second embodiment, the wear leveling history information can include information of a time stamp. Therefore, the move source page can be selected in view of a time stamp, which determines the move source page.

According to the configuration of the second modification of the second embodiment, the wear leveling history information management unit 62 of each SCM module 61 can generate a logical address list. The controller 40 can select a move source page based on the logical address list.

According to the configuration of the third modification of the second embodiment, a high-load SCM module 61 can be excluded from the move destination. As a result, loads can be distributed among the SCM modules 61.

According to the configuration of the fourth modification of the second embodiment, a high hit-rate DRAM module 60 can be excluded from the move destination. As a result, a high hit-rate DRAM module 60, which contributes to suppression of an increase in the amount of accumulated wear, is maintained, while a low hit-rate DRAM module 60, which does not much contribute to suppression of an increase in the amount of accumulated wear in the SCM module 61, can be selected as a move destination.

According to the configuration of the fifth modification of the second embodiment, the host device 2 can have functions of the mapping management unit 41, the inter-module wear leveling controller 42, the module information management unit 43, and the move destination and move source determination unit 44. As a result, the circuit size of the controller 40 can be reduced.

3. Third Embodiment

Next, a third embodiment will be described. In the third embodiment, a configuration of the memory system 3 and a method of wear leveling different from those of the first and second embodiments will be described. Hereinafter, differences from the first and second embodiments will be mainly described.

3.1 Configuration of Memory System

First, an example of a configuration of the memory system 3 will be described with reference to FIG. 34. FIG. 34 is a block diagram showing an overall configuration of the data processing apparatus 1.

As shown in FIG. 34, the memory system 3 includes a controller 70, and a plurality of memory modules (storage units, or memory units) 90. For example, the memory module 90 is a Type 3 device in CXL 2.0. In the example of FIG. 34, the memory system 3 includes four memory modules 90_0 to 90_3. In the description below, the memory module is also referred to simply as "the module".

The controller 70 corresponds to a CXL switch in CXL 2.0. The controller 70 controls coupling between the host device 2 and the memory modules 90. The controller 70 controls allocation of the memory resource of the memory module 90 to the host device 2.

The controller 70 can virtually divide a memory region of the memory module 90. The controller 70 manages each divided memory region as one "logical device". The controller 70 has an interleave function. The controller 70 can execute inter-module wear leveling.

The controller 70 includes a system decoder 71, a mapping management unit 72, an inter-module wear leveling controller 73, and a buffer 74. The system decoder 71, the mapping management unit 72, the inter-module wear leveling controller 73, and the buffer 74 are coupled to one another via an internal bus. Functions of the system decoder 71, the mapping management unit 72, and the inter-module wear leveling controller 73 may be implemented by a program executed by a central processing unit (CPU) in the controller 70, or may be configured by separate circuits.

The system decoder 71 corresponds to a host-managed device memory (HDM) decoder in CXL 2.0. The system decoder 71 of the present embodiment does not convert a host physical address HPA to a logical address, as in the first embodiment. That is, the controller 70 transmits the host physical address HPA as it is to the memory module 90.

The mapping management unit 72 includes a data movement processing unit 75, a copy state management unit 76, and an interleave setting management unit 77.

The data movement processing unit 75 processes moving of data in wear leveling. In the present embodiment, the copy-on-write process is applied to moving of data in wear leveling.

The copy state management unit 76 manages a copy state table 81. The copy state table 81 is a table relating to a copy state of data in the copy-on-write process, similarly to the copy state table 33 of the first embodiment. The copy state management unit 76 updates the copy state table 81, when data is copied (a write operation is performed).

The interleave setting management unit 77 manages interleave setting information 82. The interleave setting information 82 includes information relating to the number of interleaves IW, the order of allocation of data to the target logical device, and the interleave granularity IG, similarly to the interleave setting information 32 of the first embodiment. The interleave setting management unit 77 updates the interleave setting information 82 at a time of wear leveling.

The inter-module wear leveling controller 73 controls inter-module wear leveling. The inter-module wear leveling controller 73 includes a module information management unit 78 and a move destination and move source determination unit 79.

The module information management unit 78 is similar to the module information management unit 43 of the second embodiment. The module information management unit 78 manages module management information 83 relating to an amount of accumulated wear, a storage capacity, a wear leveling cycle, and a wear leveling granularity of each memory module 90 (logical device LD).

The move destination and move source determination unit 79 is similar to the move destination and move source determination unit 44 of the second embodiment. The move destination and move source determination unit 79 determines a move source page and a move destination page in wear leveling based on the module management information 83 and the wear leveling history information of each memory module 90.

The buffer memory 74 is a volatile memory. For example, the buffer 74 is an SRAM. The buffer 74 stores the copy state table 81, the interleave setting information 82, and the module management information 83. The buffer 74 can store the wear leveling history information received from each memory module 90.

Next, the configuration of the memory module 90 will be described. The memory module 90 corresponds to a CXL memory in CXL 2.0. For example, the memory module 90 is a Type 3 device in CXL 2.0. The memory module 90 is a storage medium (semiconductor memory device). The memory module 90 may be a volatile storage medium or a non-volatile storage medium. The configurations of the memory modules 90 may be different from one another. In the following, a case in which memory modules 90_0 to 90_3 are low-endurance memories will be described. The memory module 90 corresponds to the memory module 20 of the first embodiment, the first memory module 60 of the second embodiment, or the second memory module 61 of the second embodiment. The controller 70 can perform inter-module wear leveling on the memory modules 90_0 to 90_3.

The memory module 90 includes a wear leveling controller 91 and a memory 92.

The wear leveling controller 91 controls in-module wear leveling. The wear leveling controller 91 includes a wear leveling history information management unit 93.

The wear leveling history information management unit 93 is similar to the wear leveling history information management unit 62 of the second embodiment. The wear leveling history information management unit 93 manages history information of in-module wear leveling executed in the memory module 90. For example, the wear leveling history information management unit 93 transmits wear leveling history information to the move destination and move source determination unit 79 of the controller 70. In this embodiment, since the memory module 90 receives the host physical address HPA from the controller 70, the wear leveling history information includes the host physical address HPA instead of the logical address in the second embodiment explained above with reference to FIG. 22.

The memory 92 includes, for example, a plurality of NAND flash memories.

3.2 Flow of Moving of Data in Wear Leveling

Figure 35:
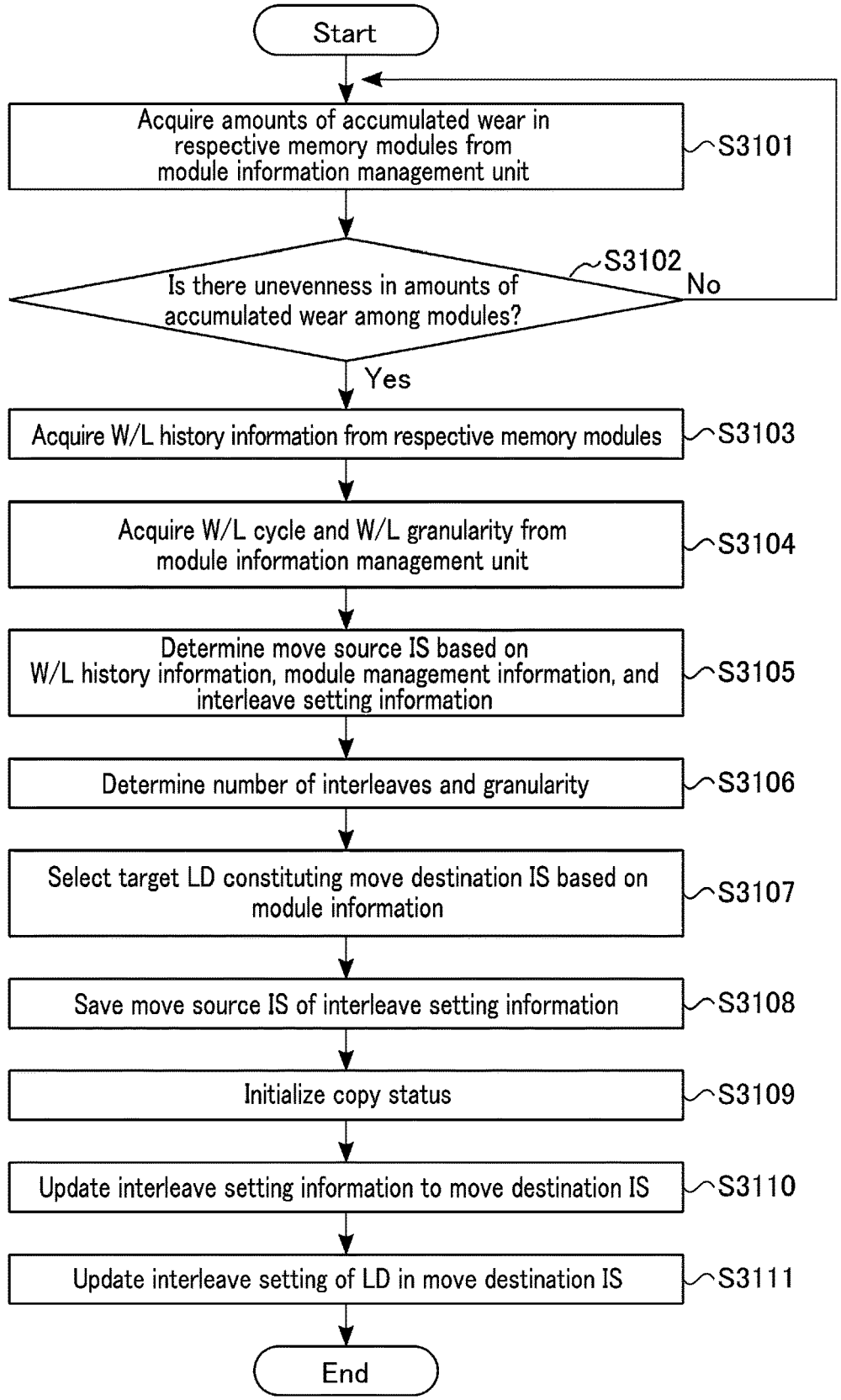
FIG. 35 is a flowchart showing moving of data in wear leveling in the memory system according to the third embodiment.

Next, an example of a flow of moving of data in wear leveling will be described with reference to FIG. 35. FIG. 35 is a flowchart showing moving of data in the wear leveling.

As shown in FIG. 35, the move destination and move source determination unit 79 acquires information relating to the amounts of accumulated wear in the respective memory modules 90 from the module information management unit 78 (S3101). The module information management unit 78 transmits information relating to the amount of accumulated wear in the module management information 83 to the move destination and move source determination unit 79.

The move destination and move source determination unit 79 checks whether there is unevenness in the amounts of accumulated wear among modules (S3102). That is, the move destination and move source determination unit 79 checks whether the variation in the amounts of accumulated wear in the respective memory modules 90 is equal to or larger than a preset threshold value. If the memory module 90 is virtually divided into a plurality of logical devices LD, the move destination and move source determination unit 79 may check whether there is unevenness in the amounts of accumulated wear among logical devices LD.

If there is no unevenness in the amounts of accumulated wear (S3102_No), the move destination and move source determination unit 79 proceeds to step S3101. If there is unevenness in the amount of accumulated wear (S3102_Yes), the move destination and move source determination unit 79 acquires wear leveling history information from the respective memory modules 90 (S3103).

Next, the move destination and move source determination unit 79 acquires information relating to the wear leveling cycle and the wear leveling granularity of each memory module 90 from the module information management unit 78 (S3104). The module information management unit 78 transmits the information relating to the wear leveling cycle, the wear leveling granularity, etc. of the module management information 83 to the move destination and move source determination unit 79.

The move destination and move source determination unit 79 determines a move source interleave set IS based on the wear leveling history information, the module management information 83, and the interleave setting information 82 (S3105). For example, the move destination and move source determination unit 79 selects an interleave set IS corresponding to the logical device LD of the memory module 90 in which the amount of accumulated wear is relatively large as a move source interleave set IS.

The move destination and move source determination unit 79 determines the number of interleaves IW and the interleave granularity IG of a move destination (S3106). The number of interleaves IW and the interleave granularity IG are determined in the same manner as in the first embodiment.

The move destination and move source determination unit 79 selects a target logical device LD corresponding to the move destination interleave set IS based on the module management information (the amount of accumulated wear) 84 (S3107). For example, the flow of selection of a target logical device LD is the same as that in the first embodiment.

The move destination and move source determination unit 79 saves the interleave set IS of the move source (before updating) of the interleave setting information 82 (S3108). For example, the move destination and move source determination unit 79 saves the interleave set IS of the move source (before updating) of the interleave setting information 82 to another memory region.

The move destination and move source determination unit 79 initializes the copy status of the copy state table 81 (S3109). More specifically, the move destination and move source determination unit 79 sets the copy flag corresponding to the move source interleave set IS to an all "0" state in the copy state table.

The move destination and move source determination unit 79 updates the interleave setting information 82 to the move destination interleave set IS (S3110). More specifically, the move destination and move source determination unit 79 updates the interleave setting information 82 to the number of interleaves IW, the interleave granularity IG, and the target logical device LD determined in steps S3106 and S3107. For example, the move destination and move source determination unit 79 transmits the updated interleave setting information 82 to the system decoder 71.

The move destination and move source determination unit 79 transmits the updated interleave set IS to the logical device LD corresponding to the move destination interleave set IS, and updates the interleave setting relating to the logical device LD (S3111).

3.3 Specific Examples of Selection of Move Source Interleave Set

Next, specific examples of selection of a move source interleave set IS explained in step S3105 in FIG. 35 will be described.

3.3.1 First Specific Example

Figure 36:
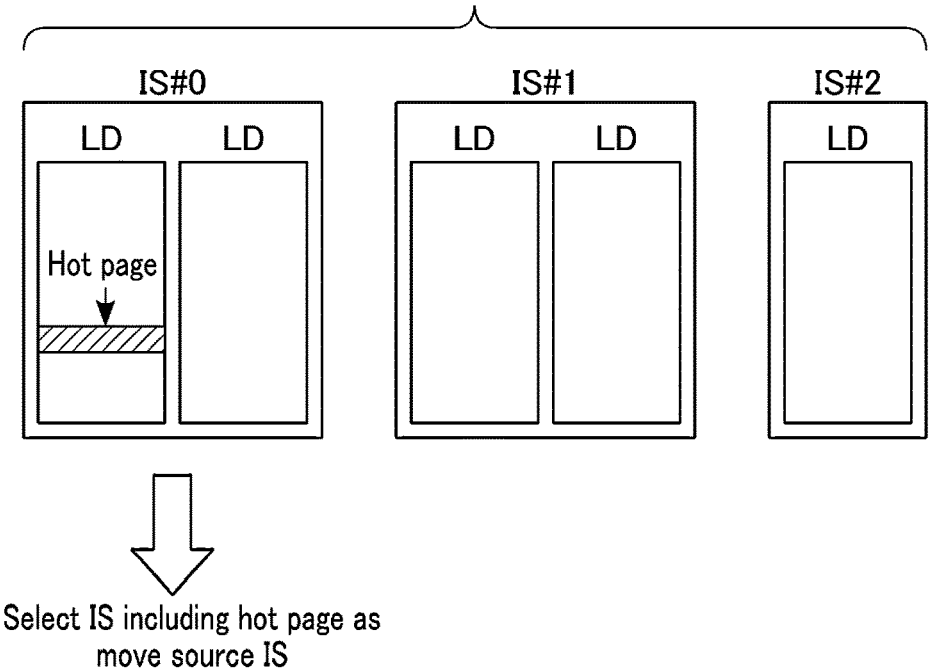
FIG. 36 is a diagram for explaining a first specific example of selection of a move source interleave set in the memory system according to the third embodiment.

A first specific example will be described with reference to FIG. 36. FIG. 36 is a diagram for explaining the first specific example of selection of a move source interleave set IS.

As shown in FIG. 36, the move destination and move source determination unit 79 refers to the wear leveling history information and detects a hot page. The move destination and move source determination unit 79 selects an interleave set IS including a hot page as a move source. In the example of FIG. 36, a logical device LD corresponding to an interleave set IS #0 includes a hot page. Therefore, the move destination and move source determination unit 79 selects the interleave set IS #0 as the move source.

3.3.2 Second Specific Example

Figure 37:
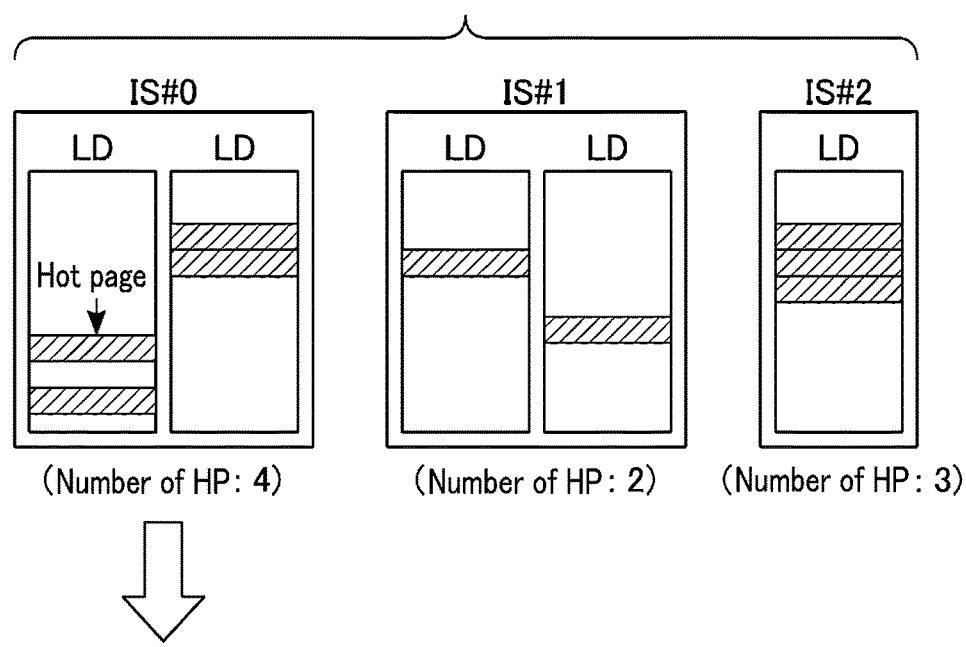
FIG. 37 is a diagram for explaining a second specific example of selection of a move source interleave set in the memory system according to the third embodiment.

A second specific example will be described with reference to FIG. 37. FIG. 37 is a diagram for explaining the second specific example of selection of a move source interleave set IS.

As shown in FIG. 37, if there are a plurality of hot pages, the move destination and move source determination unit 79 selects an interleave set IS that includes the largest number of hot pages as a move source. In the case of FIG. 37, each of two logical devices LD corresponding to the interleave set IS #0 includes two hot pages. That is, the number of hot pages in the interleave set IS #0 is 4. Each of two logical devices LD corresponding to the interleave set IS #1 includes one hot page. That is, the number of hot pages in the interleave set IS #1 is 2. One logical device LD corresponding to the interleave set IS #2 includes three hot pages. That is, the number of hot pages in the interleave set IS #2 is 3. Therefore, the move destination and move source determination unit 79 selects the interleave set IS #0 that includes the largest number of hot pages as a move source.

A move destination interleave set IS may be selected also in view of the writing amount in each page.

3.3.3 Third Specific Example

A third specific example will be described with reference to FIG. 38. FIG. 38 is a diagram for explaining the third specific example of selection of a move source interleave set IS.

As shown in FIG. 38, if there are a plurality of hot pages, the move destination and move source determination unit 79 selects an interleave set IS that includes the largest number of hot pages in a logical device LD as a move source. In the example of FIG. 38, a maximum number of hot pages of two logical devices LD corresponding to the interleave set IS #0 is 2. A maximum number of hot pages of two logical devices LD corresponding to the interleave set IS #1 is 1. A maximum number of hot pages of one logical device LD corresponding to the interleave set IS #2 is 3. Therefore, the move destination and move source determination unit 79 selects, as a move source, the interleave set IS #2 which includes the largest number of hot pages per logical device LD.

A move destination interleave set IS may be selected also in view of the writing amount in each page.

3.4 Specific Example of Target Logical Device Selection

Next, specific examples of selection of the target logical device LD explained in step S3107 in FIG. 35 will be described.

3.4.1 First Specific Example

A first specific example will be described with reference to FIG. 39. FIG. 39 is a diagram for explaining a first specific example of selection of a target logical device LD.

As shown in FIG. 39, the move destination and move source determination unit 79 has a pool of free logical devices LD which have not been allocated to any interleave set IS in advance. The move destination and move source determination unit 79 preferentially selects a logical device LD in which the amount of accumulated wear is small from the pool of free logical devices LD (hereinafter also referred to as the "free LD pool"). In the example of FIG. 39, six logical devices LD are pooled in the free LD pool. The amounts of accumulated wear in the six logical devices LD are respectively 1, 20, 10, 8, 40, and 13, sequentially from the left side of FIG. 39. The number of interleaves IW of the move destination interleave set IS is 4. Therefore, the move destination and move source determination unit 79 selects, as the target logical devices LD, logical devices LD in ascending order of the amounts of accumulated wear, namely, the logical device LD of the amount of accumulated wear 1, the logical device LD of the amount of accumulated wear 8, the logical device LD of the amount of accumulated wear 10, and the logical device LD of the amount of accumulated wear 13.

3.4.2 Second Specific Example

A second specific example will be described with reference to FIG. 40. FIG. 40 is a diagram for explaining a second specific example of selection of a target logical device LD.

As shown in FIG. 40, if the logical devices LD in the free LD pool are insufficient, the move destination and move source determination unit 79 reduces the number of interleaves IW of the interleave set IS in use to secure free logical devices LD. In the example of FIG. 40, the number of interleaves IW of the interleave set IS in use is 4. The move destination and move source determination unit 79 reduces the number of interleaves IW of the interleave set IS in use to 2, and secures two free logical devices LD. Then, the move destination and move source determination unit 79 selects the secured two free logical devices LD as target logical devices LD.

3.4.4 Third Specific Example

A third specific example will be described with reference to FIG. 41. FIG. 41 is a diagram for explaining a third specific example of selection of a target logical device LD.

As shown in FIG. 41, if a free logical device LD in a free LD pool includes a hot page or the writing amount of the free logical device LD is larger than a preset threshold value, the move destination and move source determination unit 79 may select a free high-endurance logical device LD from a high-endurance LD pool without selecting a logical device LD in the free LD pool. The high-endurance LD pool is a pool of free high-endurance logical devices LD. The high-endurance logical devices LD are, for example, DRAMs. In the example of FIG. 41, the move destination and move source determination unit 79 selects, as a target logical device LD, a logical device LD of the high-endurance pool instead of a logical device LD including a hot page in a free LD pool.

3.4.3 Fourth Specific Example

Next, a fourth specific example will be described. The move destination and move source determination unit 79 may select, as a move destination, an interleave set IS in which the amount of accumulated wear is small from among the interleave sets IS in use, and swaps the move source interleave set IS with the selected interleave set, in the same manner as in the second modification of the first embodiment.

3.5 Advantages of Present Embodiment

According to the configuration of the present embodiment, the mapping table and the access counter table can be omitted from the memory system 3. Consequently, the amount of data of management information in the wear leveling among memory modules can be reduced in the memory system 3.

Furthermore, according to the configuration of the present embodiment, the copy-on-write process can be applied to the moving of data in wear leveling, in the same manner as in the first embodiment. Consequently, the cost for moving of data can be reduced.

4. Modification, etc

According to the above embodiment, a memory system includes a first memory region (LD0), a second memory region (LD2), and a controller (10). The controller is configured to control coupling between the first memory region and the second memory region at one end and a host device (2) at another, generate first interleave setting information (32) corresponding to the first memory region, select the first memory region based on the first interleave setting information when an access request is received from the host device, and update the first interleave setting information to second interleave setting information corresponding to the second memory region and not corresponding to the first memory region based on an amount of accumulated wear in the first memory region.

According to the embodiments described above, it is possible to provide a memory system in which the amount of data of management information in wear leveling among memory modules is reduced.

The embodiments are not limited to the above-described aspect, and can be modified in various ways. The embodiments described above may be combined to the extent possible.

Furthermore, the term "couple" in the above-described embodiments also includes the state of indirect coupling with other components, such as a transistor and a resistor, interposed therebetween.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first memory region;
a second memory region; and
a controller configured to:
control coupling between the first memory region and the second memory region at one end and a host device at another;
generate first interleave setting information corresponding to the first memory region;
select the first memory region based on the first interleave setting information when an access request is received from the host device; and
update the first interleave setting information to second interleave setting information corresponding to the second memory region and not corresponding to the first memory region based on an amount of accumulated wear in the first memory region.

2. The memory system according to claim 1, further comprising:
a first memory unit including the first memory region; and
a second memory unit including the second memory region,
wherein
the first memory unit is configured to output the amount of accumulated wear in the first memory region to the controller.

3. The memory system according to claim 1, wherein the first interleave setting information includes identification information of the first memory region.

4. The memory system according to claim 1, wherein the amount of accumulated wear in the first memory region is larger than an amount of accumulated wear in the second memory region.

5. The memory system according to claim 1, wherein the controller is further configured to:
after updating the first interleave setting information to the second interleave setting information, update first data in the first memory region corresponding to the first interleave setting information based on a write request received from the host device; and move the updated first data to the second memory region corresponding to the second interleave setting information.

6. The memory system according to claim 5, wherein the controller includes a copy state table corresponding to the first interleave setting information, and is further configured to manage whether the first data in the first memory region corresponding to the first interleave setting information has been moved or not based on the copy state table.

7. The memory system according to claim 6, wherein the controller is further configured to:
   when a read request is received from the host device after the first interleave setting information has been updated to the second interleave setting information, refer to the copy state table;
   when second data as a target of reading has not been moved from the first memory region to the second memory region, read the second data from the first memory region based on the first interleave setting information; and
   when the second data has been moved from the first memory region to the second memory region, read the second data from the second memory region based on the second interleave setting information.

8. The memory system according to claim 6, wherein the controller is further configured to:
   when the first data is to be updated based on the write request, refer to the copy state table;
   when the first data has been moved, write the updated first data into the second memory region based on the second interleave setting information; and
   when the first data has not been moved, read the first data from the first memory region based on the first interleave setting information, write the updated first data into the second memory region based on the second interleave setting information, and update the copy state table.

9. The memory system according to claim 6, wherein the controller is further configured to:
   refer to the copy state table;
   move, to the second memory region, third data that is in the first memory region and has not been moved; and
   update the copy state table.

10. The memory system according to claim 1, wherein the controller includes a first decoder configured to set coupling to the first memory region based on the first interleave setting information, and a second decoder configured to set coupling to the second memory region based on the second interleave setting information, and
when the first interleave setting information is to be updated to the second interleave setting information, the first decoder is coupled to the second memory region based on the second interleave setting information, and the second decoder is coupled to the first memory region based on the first interleave setting information.

11. The memory system according to claim 1, wherein the controller is further configured to update the first interleave setting information to the second interleave setting information based on the amount of accumulated wear in the first memory region and information of wear leveling executed in the first memory region.

12. A memory system comprising:
a plurality of memory units; and
a controller configured to:
   control coupling between the plurality of memory units and a host device;
   determine to execute exchange of data among the memory units based on unevenness in an amount of accumulated wear among the memory units; and
   select memory units, as targets of the exchange, from among the memory units based on information of wear leveling executed in each of the memory units, a cycle of the wear leveling, and a data size of the wear leveling.

13. The memory system according to claim 12, wherein the information of the wear leveling is a list of logical addresses at which the wear leveling is executed.

14. The memory system according to claim 12, wherein the information of the wear leveling is a list of logical addresses at which the wear leveling is executed and numbers of times of executing the wear leveling corresponding to the logical addresses.

15. The memory system according to claim 12, wherein the controller is further configured to:
   select, as a move source of data in the exchange, a first memory unit in which the amount of accumulated wear is largest from among the memory units; and
   when a product of the cycle of the wear leveling and a number of times of executing the wear leveling corresponding to a logical address at which the wear leveling is executed in the first memory unit is larger than a preset first threshold value, select a page corresponding to the logical address as a move source page.

16. The memory system according to claim 15, wherein the memory units include a second memory unit, and a third memory unit which has an endurance lower than that of the second memory unit, and
the controller is further configured to:
   when the product is larger than a second threshold value that is larger than the first threshold value, select the second memory unit as a move destination of data in the exchange; and
   when the product is equal to or smaller than the second threshold value, select the third memory unit as the move destination of data in the exchange.

17. The memory system according to claim 16, wherein the amount of accumulated wear in the first memory unit is larger than an amount of accumulated wear in the third memory unit.

18. The memory system according to claim 16, wherein the controller is further configured to:
   acquire load information of the third memory unit; and
   when a load higher than a preset third threshold value is applied to the third memory unit, not select the third memory unit as the move destination of data in the exchange.

19. The memory system according to claim 16, wherein the controller is further configured to, when an access rate of the second memory unit is equal to or higher than a preset fourth threshold value, not select the second memory unit as a move destination of data in the exchange.

20. The memory system according to claim 13, wherein the information of the wear leveling includes information relating to a time when the wear leveling is executed.

\* \* \* \* \*